US012380808B2

(12) United States Patent
Meek et al.

(10) Patent No.: US 12,380,808 B2
(45) Date of Patent: Aug. 5, 2025

(54) DYNAMIC APPROACH PROCEDURE SYSTEM

(71) Applicant: The Boeing Company, Arlington, VA (US)

(72) Inventors: Jordan Timothy Meek, Portland, ME (US); Charles E. Gehin-Scott, Belfast, ME (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/440,750

(22) Filed: Feb. 13, 2024

(65) Prior Publication Data

US 2024/0312352 A1  Sep. 19, 2024

Related U.S. Application Data

(63) Continuation of application No. 17/127,403, filed on Dec. 18, 2020, now Pat. No. 11,900,822.

(51) Int. Cl.

| | |
|---|---|
| *G08G 5/54* | (2025.01) |
| *G06F 3/0482* | (2013.01) |
| *G06F 3/0484* | (2022.01) |
| *G06T 11/00* | (2006.01) |
| *G08G 5/32* | (2025.01) |
| *G08G 5/50* | (2025.01) |
| *G08G 5/55* | (2025.01) |

(52) U.S. Cl.
CPC ............ *G08G 5/54* (2025.01); *G06F 3/0482* (2013.01); *G06F 3/0484* (2013.01); *G06T 11/00* (2013.01); *G08G 5/32* (2025.01); *G08G 5/50* (2025.01); *G08G 5/55* (2025.01); *G06T 2200/24* (2013.01)

(58) Field of Classification Search
CPC ...... G08G 5/0047; G08G 5/025; G06T 11/00; G06T 2200/24; G06T 5/55
See application file for complete search history.

(56) References Cited

U.S. PATENT DOCUMENTS

| | | | |
|---|---|---|---|
| 7,546,206 B1* | 6/2009 | Miller | ............... G08G 5/0091 701/120 |
| 8,780,091 B2 | 7/2014 | Green | |
| 8,928,700 B1 | 1/2015 | Khafizova | |
| 2010/0148991 A1* | 6/2010 | Aspen | ................... G01C 23/00 340/971 |

(Continued)

*Primary Examiner* — Andrea C Leggett
(74) *Attorney, Agent, or Firm* — Neal, Gerber & Eisenberg LLP

(57) ABSTRACT

A method and apparatus dynamically update customized integrated terminal approach procedure interfaces based on changing real-time events associated with aircraft and airports. A dynamic approach procedures application extracts and analyzes terminal approach data, aircraft data, airport data and real-time weather data to automatically generate an integrated terminal approach interface. The integrated terminal approach interface presents dynamic digital approach information, the interface including a map interface and a procedure side bar displaying route-related procedures data to assist pilots with selecting a route into the destination airport. As conditions change, displayed terminal approach data within the map and procedure side bar is updated and route recommendations are refined, to assist a user in selecting destination airports, routes, and relevant approach procedures.

20 Claims, 24 Drawing Sheets

(56) References Cited

U.S. PATENT DOCUMENTS

| | | |
|---|---|---|
| 2011/0288768 A1 | 11/2011 | Stefani |
| 2012/0081365 A1 | 4/2012 | Nakagawa |
| 2012/0191424 A1 | 7/2012 | Pershing |
| 2014/0156114 A1* | 6/2014 | Aymeric ............ G01C 23/00 701/3 |
| 2014/0309821 A1* | 10/2014 | Poux .................. B64D 45/00 701/14 |
| 2014/0337796 A1 | 11/2014 | Burgin et al. |
| 2016/0093222 A1* | 3/2016 | Hale ................. G08G 5/0021 701/120 |
| 2016/0321764 A1 | 11/2016 | Cardoso |
| 2019/0213897 A1* | 7/2019 | Jayathirtha ......... B64D 45/00 |
| 2020/0168104 A1 | 5/2020 | Holder |

\* cited by examiner

DYNAMIC APPROACH PROCEDURE SYSTEM

CROSS-REFERENCE TO RELATED APPLICATION

This application is a continuation application of and claims priority to U.S. patent application Ser. No. 17/127,403, entitled "DYNAMIC APPROACH PROCEDURE SYSTEM," filed on Dec. 18, 2020, the disclosure of which is incorporated herein by reference in its entirety.

BACKGROUND

A terminal approach plate is a static document providing terminal approach procedures and other information associated with an airport and/or runway approach utilized by a pilot during landing. A pilot typically carries dozens or even hundreds of these paper terminal approach plate documents for utilization during selecting and planning pre-flight approaches.

In some cases, digital approach plates may be utilized. Although these documents eliminate the need for multiple paper plates, the digital plates remain static and incapable of reflecting updates to procedures, weather changes or other dynamic conditions. Moreover, these static plates frequently include information which is not needed by the pilot and which makes identifying needed information from the approach plates more difficult. Likewise, if weather or other conditions make in-flight procedure changes necessary, the pilot is generally required to manually obtain the weather updates and information needed from the static terminal approach plates to update approach procedures. This process is a difficult, time-consuming, and potentially frustrating process for users.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed to presenting customized and integrated terminal approach procedures information dynamically within a user interface. An implementation includes a plurality of data sources providing aircraft data associated with a selected aircraft, airport data associated with at least one airport and real-time weather data associated with a set of possible routes between a selected departure airport and at least one destination airport. An integrated approach user interface information display is provided via a user interface device associated with a computing device.

The integrated approach interface includes a map interface and a procedure side bar providing integrated terminal approach data associated with the set of possible routes based on the aircraft data, and the airport data, wherein data displayed within the integrated approach user interface information display is customized. A set of recommendations is generated based on an evaluation of the integrated terminal approach data and real-time weather data updates. The set of recommendations include a set of recommended routes selected from the set of possible routes. The integrated approach interface information display is updated in response to generating the set of recommendations. The update includes displaying data associated with the set of recommended routes and removal of data from the approach user interface information display that is associated with routes excluded from the set of recommended routes from the map interface and the procedure side bar.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
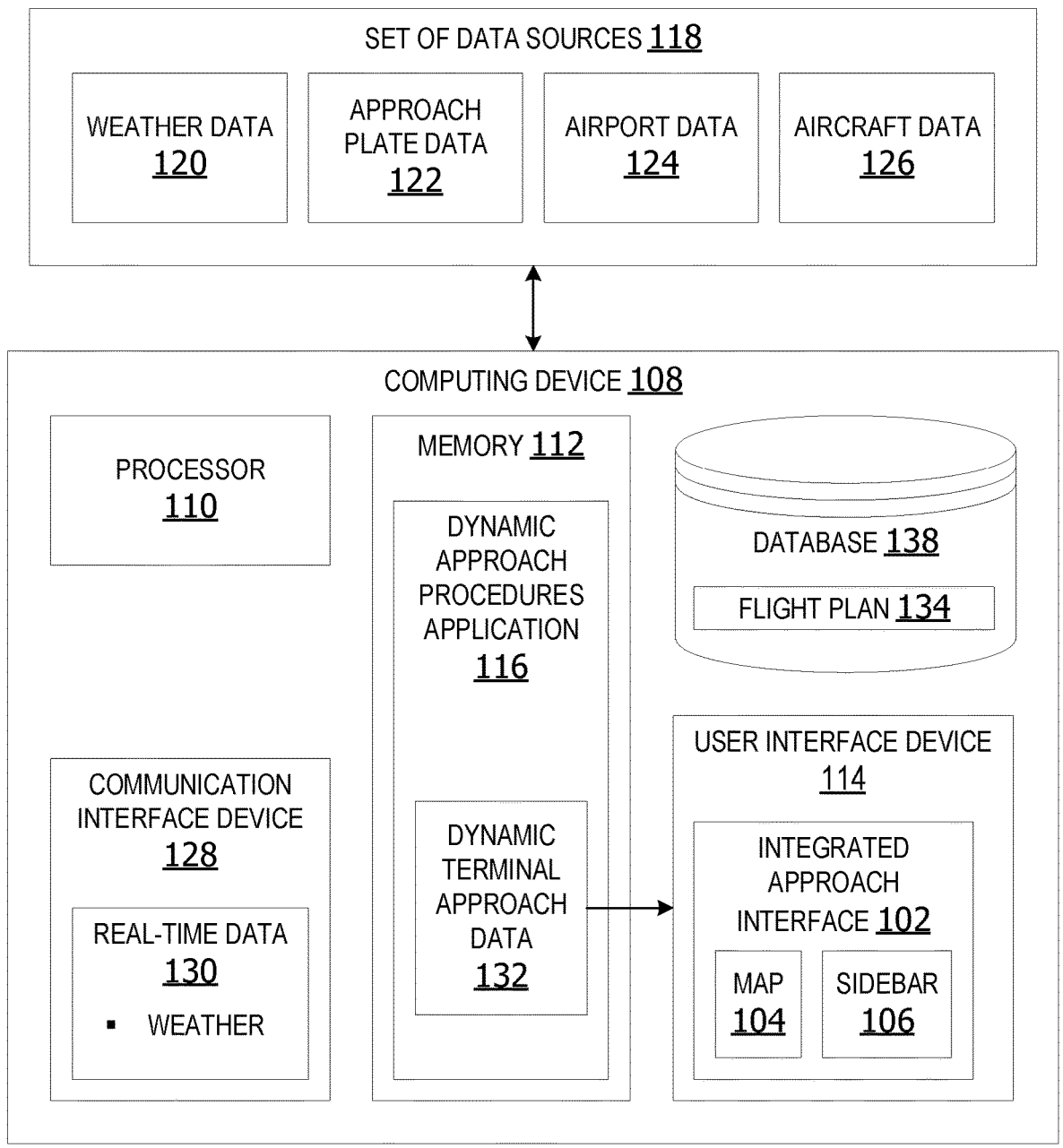
FIG. 1 is a block diagram illustrating a system for generating an integrated approach interface, including a map interface and a procedures sidebar, according to an implementation.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Referring to the figures, examples of the disclosure enable an integrated approach interface providing dynamic digital terminal approach data integrated into a single interactive information display. In some examples, a dynamic approach procedures application is provided which automatically evaluates aircraft data, airport data, and real-time weather data with integrated terminal approach data to identify possible approaches in a destination airport. The available approaches are presented to the user in an integrated approach interface presented within a user interface device. This enables improved elimination of production errors between data maintenance and precomposed interfaces production by deriving the presentation of terminal procedures directly from data. This analysis of real-time data by the dynamic approach procedures application increases the speed and efficiency of data production and increases data quality.

Other examples provide a dynamic approach procedures application that curates or modifies procedure data such that only data relevant to the user's available approaches and/or selected approach are displayed within the map interface and/or side bar of the integrated approach interface. This provides faster and more efficiently tailored procedures data to the user, while simultaneously decreasing the size of terminal procedure data sets once precomposed interfaces are removed. This further improves the user experience and user efficiency via the user interface interaction. In some examples, the digital terminal approach data utilized by the dynamic approach procedures application can be automatically updated via application update or styling bundle in data. This eliminates the need to manually edit thousands of static terminal approach plates by hand.

In other examples, the integrated approach information display provides streamlined and customized pilot approach procedures to a user during challenging phases of flight for pilots. The information is easier to consume and less error prone. This assists the user in obtaining necessary information quickly. In some examples, the system generates a set of recommendations based on an evaluation of the integrated terminal approach data and real-time weather data updates. The set of recommendations, in some examples, includes a recommended approach selected from the set of possible approaches. This feature enables quick and efficient selection of an appropriate approach into a destination airport for improved accuracy and fewer errors.

In still other examples, a procedural side bar is provided within the user interface to provide additional information associated with the terminal approach procedures in a linear format. This enables information that would otherwise be scattered all over the interface to be consolidated in a linear or hierarchical manner reflecting the order in which the information is typically consumed or required by the user. This further improves user efficiency and reduces user time spent in obtaining desired information from the integrated approach interface.

Referring more particularly to the figures, FIG. 1 illustrates an example of a system 100 for generating an integrated approach interface 102, including a map 104 and a procedures sidebar 106. The integrated approach interface 102 is a digital terminal approach interface having information from a plurality of terminal approach plates integrated into a dynamic and interactive interface providing customized information associated with various airports, routes, and terminal approaches. In this example, the integrated approach interface includes the map 104 and the procedures side bar 106 for organizing and presenting the customized and dynamically updated approach information to the user. It should be appreciated that different or additional information can be provided.

In the example of FIG. 1, a computing device 108 represents any device executing computer-executable instructions (e.g., as application programs, operating system functionality, or both) to implement the operations and functionality associated with the computing device 108. The computing device 108 in some examples includes a mobile computing device or any other portable device. A mobile computing device includes, for example but without limitation, a mobile telephone, laptop, tablet, computing pad, netbook, and/or any other type of portable computing device. The computing device 108 can also include less-portable devices such as servers, desktop personal computers, kiosks, or tabletop devices. Additionally, the computing device 108 can represent a group of processing units or other computing devices.

In some examples, the computing device 108 has at least one processor 110 and a memory 112, and also includes a user interface device 114, which presents (e.g., displays) the integrated approach interface 102 to a user. The processor 110 includes any quantity of processing units and is programmed to execute the computer-executable instructions, such as, but not limited to, the dynamic approach procedures application 116. The computer-executable instructions are performed by the processor 110, performed by multiple processors within the computing device 108 or performed by a processor external to the computing device 108. In some examples, the processor 110 is programmed to execute instructions such as those illustrated in the figures (e.g., FIG. 21, FIG. 22, and/or FIG. 23).

The computing device 108 further has one or more computer-readable media such as the memory 112. The memory 112 includes any quantity of media associated with or accessible by the computing device 108. The memory 112 in some examples is internal to the computing device 108 (as shown in FIG. 1). In other examples, the memory 112 is external to the computing device (not shown) or both (not shown). The memory 112 can include read-only memory and/or memory wired into an analog computing device.

The memory 112 stores data, such as the dynamic approach procedures application 116 that processes dynamic terminal approach data 132 as described in more detail herein. In general, one or more applications, when executed by the processor 110, operate to perform functionality on the computing device 108. The application(s) can communicate with counterpart applications or services, such as web services accessible via a network. In an example, the applications represent downloaded client-side applications that correspond to server-side services executing in a cloud.

The dynamic approach procedures application 116 is a software component for generating the integrated approach interface 102 within the user interface device 114 for viewing and utilization by a pilot or other user in one example. The dynamic approach procedures application 116 in some examples accesses a set of one or more data sources 118 to obtain information used to generate and/or update the integrated approach interface 102. In this manner, the system 100 leverages existing sources of information to obtain relevant information associated with terminal approach procedures and integrates that information into the integrated approach interface 102.

The set of data sources 118 can include any type of data source, such as, a database, a cloud storage, a streaming data source, sensor devices, networked devices, and/or any other source. The data obtained from the data sources can include, without limitation, weather data 120, approach plate data 122, airport data 124 and/or aircraft data 126 associated with an aircraft, such as, but not limited to, the aircraft 1801 shown in FIG. 18. A database can include any type of data store, such as, but not limited to, a remote database accessible via the network, as well as a local database 138 associated with the computing device 108.

The database 138 in some examples is a database on a data storage device. The data storage device can include one or more different types of data storage devices, such as, for example, one or more rotating disks drives, one or more solid state drives (SSDs), and/or any other type of data storage device. The data storage device in some non-limiting examples includes a redundant array of independent disks (RAID) array. In other examples, the data storage device includes a remote data storage device, a data storage in a remote data center, or a cloud storage.

In one example, the weather data 120 includes real-time weather data obtained from sources, such as, an automatic dependent surveillance-broadcast (ADS-B). The approach plate data 122 is data which would have previously been provided within multiple terminal approach plates, eliminating the need for a user to manually obtain or extract plate data from various terminal approach plates. The terminal approach plate data is added into the integrated approach interface 102. The system 100 eliminates the need for precomposed terminal approach plates. Instead of relying on static approach plates shown within a map, the system 100 presents information that is currently obtained from static plates, dynamically within the interface.

The airport data 124 is data describing runways and landing procedures for a plurality of airports. In some examples, the airport data 124 includes data describing available airport equipment at a departure airport and/or a user-selected destination airport.

The aircraft data 126 is data identifying and/or describing an aircraft selected by the user. The aircraft data 126 can include data describing the type of aircraft, aircraft equipment, aircraft speed and/or any other aircraft data. The aircraft data 126 can be obtained from user-provided data, data obtained from a database, data obtained in real-time from a sensor, such as a fuel sensor or airspeed indicator, as well as other sources of data.

The data gathered from the data sources is integrated into the map 104 and/or the procedures side bar 106 presented to the user within the user interface. In this manner, the system 100 provides terminal approach data associated with the set of possible routes which integrates relevant portions of the aircraft data, the airport data, terminal approach plate data, weather data and/or any other data relevant to selecting approach procedures at a given destination airport. The data displayed within the integrated approach interface 102 is customized for the selected aircraft, the destination airport and the real-time weather data associated with the departure airport and/or the weather associated with the destination airport.

The dynamic approach procedures application 116 in other examples generates a set of recommendations. The recommendations can include one or more destination airports, one or more recommended routes selected from possible routes, one or more recommended approaches for a selected destination airport, or any other recommendations. The recommendations are generated based on an evaluation of the integrated terminal approach data, flight plan 134 provided by the user, real-time weather data updates and/or any other user-provided data.

The dynamic terminal approach data 132 output to the user within the integrated approach interface 102 is updated in real-time to reflect changes made to the flight plan due to weather changes, missed approach, or other events. In some examples, the map 104 displays all possible routes to a destination airport. When a user selects a route, the map 104 is updated to highlight the selected route in a map view using the map 104.

In other examples, if the system recommends a set of routes, the integrated approach interface is updated to include information associated with the recommended routes, while information associated with non-recommended routes is removed from the map 104 (map view) and/or the procedure side bar 106. In this manner, the interface remains uncluttered by information which, for example, is likely to be of little interest or usefulness to the user. The streamlined presentation of information to the user enables the user to obtain needed information more quickly and easily.

A sensor device in the set of data sources 118 can include any type of sensor for dynamically generating aircraft-related data, such as, but not limited to, the aircraft data 126. For example, but without limitation, a sensor device can include a gyroscope, accelerometer, magnetometer, global positioning satellite (GPS) system, barometer, proximity sensor, ambient light sensor, or any other type of sensor devices for measuring motion, location, movement, orientation, etc.

In some examples, the dynamic approach procedures application utilizes sensor data to determine orientation of the computing device. If the device is turned or rotated such that the interface displayed on the user interface becomes unreadable, the application reorients so the interface becomes readable and properly oriented for the user.

In one example, the dynamic approach procedures application 116 is implemented on a local, physical computing device. However, in some non-limiting examples, the dynamic approach procedures application 116 is implemented on a cloud server. The cloud server obtains data from the set of data sources and generates the integrated approach interface 102, which is transmitted to the computing device 108 via a network. A cloud server is a logical server providing services to a computing device or other clients. The cloud server is hosted and/or delivered via the network. In some non-limiting examples, the cloud server is associated with one or more physical servers in one or more data centers. In other examples, the cloud server is associated with a distributed network of servers.

In some examples, the computing device 108 optionally includes a communications interface device 128. The communications interface device 128 includes a network interface card and/or computer-executable instructions (e.g., a driver) for operating the network interface card. Communication between the computing device 108 and the set of data sources 118 can occur in whole, or in part, using any protocol or mechanism over any wired or wireless connection. In some examples, the communications interface device 128 is operable with short range communication technologies, such as by using near-field communication (NFC) tags. In still other examples, the communication interface device 128 enables the computing device 108 to receive real-time data 130, such as weather updates or any other type of data, from the set of data sources 118.

The computing device 108 shown in FIG. 1 is depicted as a stand-alone computing device. However, in other examples, the computing device may be a device hardwired or installed on board an aircraft, such as the aircraft 1801 illustrated in FIG. 18. The aircraft may be implemented as an airplane, helicopter, or other transportation vehicle. In still other examples, the computing device 108 can be a portable user device carried or utilized on-board an aircraft. In yet other examples, the computing device 108 can be a computing device installed within an aircraft which is removable, rather than hardwired into the aircraft. However, the examples are not limited to utilization of the computing device on-board an aircraft, such as the aircraft shown in FIG. 24 below.

In other examples, the system 100 provides dynamic terminal approach information for pilots and other users in an automated fashion that takes into account the type of aircraft and aircraft equipment, aircraft speed, available airport equipment, and weather (and/or other information). The system provides the approach information using symbology directly on the interface, including the map interface being used to navigate and/or the side bar. The approach information is updated dynamically, in real-time, based on changing weather conditions, user selection of an approach, etc. in various examples.

Figure 2:
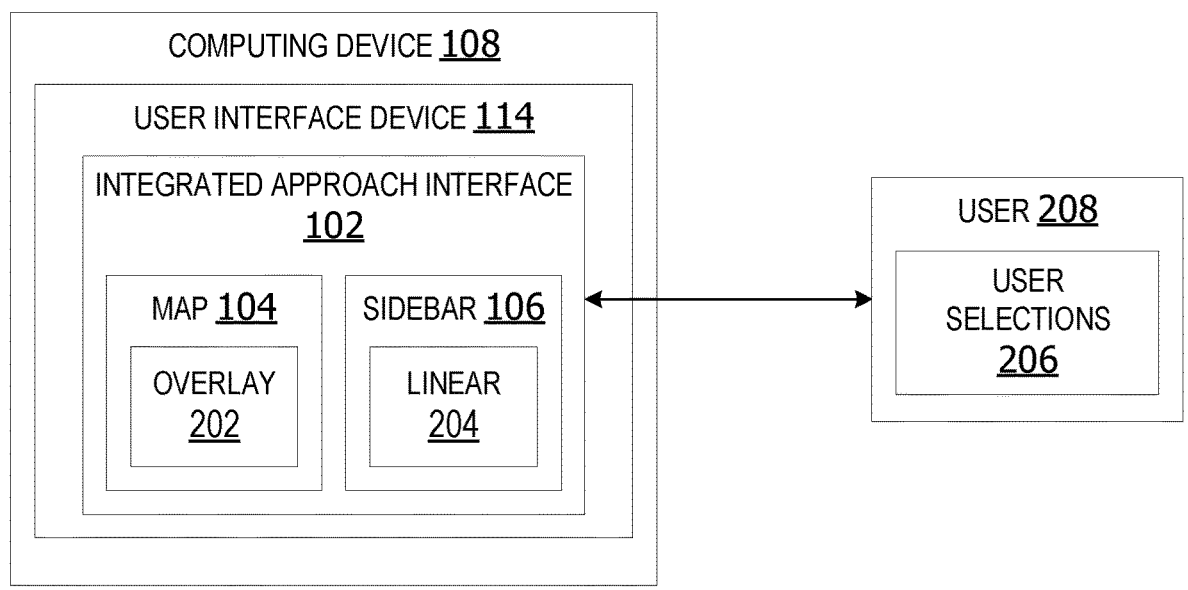
FIG. 2 is a block diagram illustrating an integrated approach interface for utilization by a user according to an implementation.

FIG. 2 illustrates an integrated approach interface 102 presented within a user interface device 114 for utilization by a user 208. In this non-limiting example, the integrated approach interface 102 presents customized dynamic terminal approach data to the user 208 in the form of the map 104 and the procedural side bar 106 combination. The map 104 provides a representation of an area within a vicinity of one or more airports. The area shown on the map can be determined based on a user-configurable radius "N" from an airport. In other examples, the area depicted on the map 104 can include a user-selected number "N" of square miles surrounding one or more airports, or any other area.

The area depicted on the map 104 includes an overlay 202. The overlay 202 is a set of symbols representing one or more possible routes into a selected airport. The overlay 202 can also include, for example, but without limitation, symbols representing other approach information for one or more possible approaches, such as, but not limited to, runway identifiers, waypoints, approach speeds, fixes, etc.

The procedural side bar 106 presents customized procedures information to the user 208 in a linear format. In some examples, the linear format provides information in a condensed form without including information unrelated to the user selected aircraft, airport and/or route. In other words, any terminal approach procedure information unrelated to the user's flight plan and current selected route(s) are removed from display within the integrated approach interface 102 for a streamlined presentation of information to the user. This improves user efficiency identifying relevant information which is likely to be most beneficial to the user at the moment the information is being displayed.

The integrated approach interface 102 in other examples is updated dynamically in response to user selections 206. The user selections 206 can include, for example, user selection of a destination airport, user selection of a route from two or more possible routes into a destination airport, user selection of an approach, etc. As each user selection is received, the system updates the information displayed within the integrated approach interface to highlight selected routes, display information associated with selected airports and approaches, remove information from display that is associated with un-selected routes, approaches or airports, etc. This real-time updating ensures the most relevant and useful information is currently being presented to the user for evaluation and utilization in-flight or during pre-flight planning.

In still other examples, the system evaluates information regarding the aircraft and current weather conditions combined with information on the approach interface to assimilate data and make recommendations to the user regarding approach and route selection. This assists users in selecting the right procedure for the aircraft and conditions. The integrated information is provided in the combination of the map 104 and the side bar 106, enabling a scrollable list of approach information and dynamic updates. The system 100 presents the customized information in both text form within the side bar and in graphical form within the map, based on the path(s) being evaluated in some examples. This improves the ability of users to consume the information quickly and easily.

Figure 3:
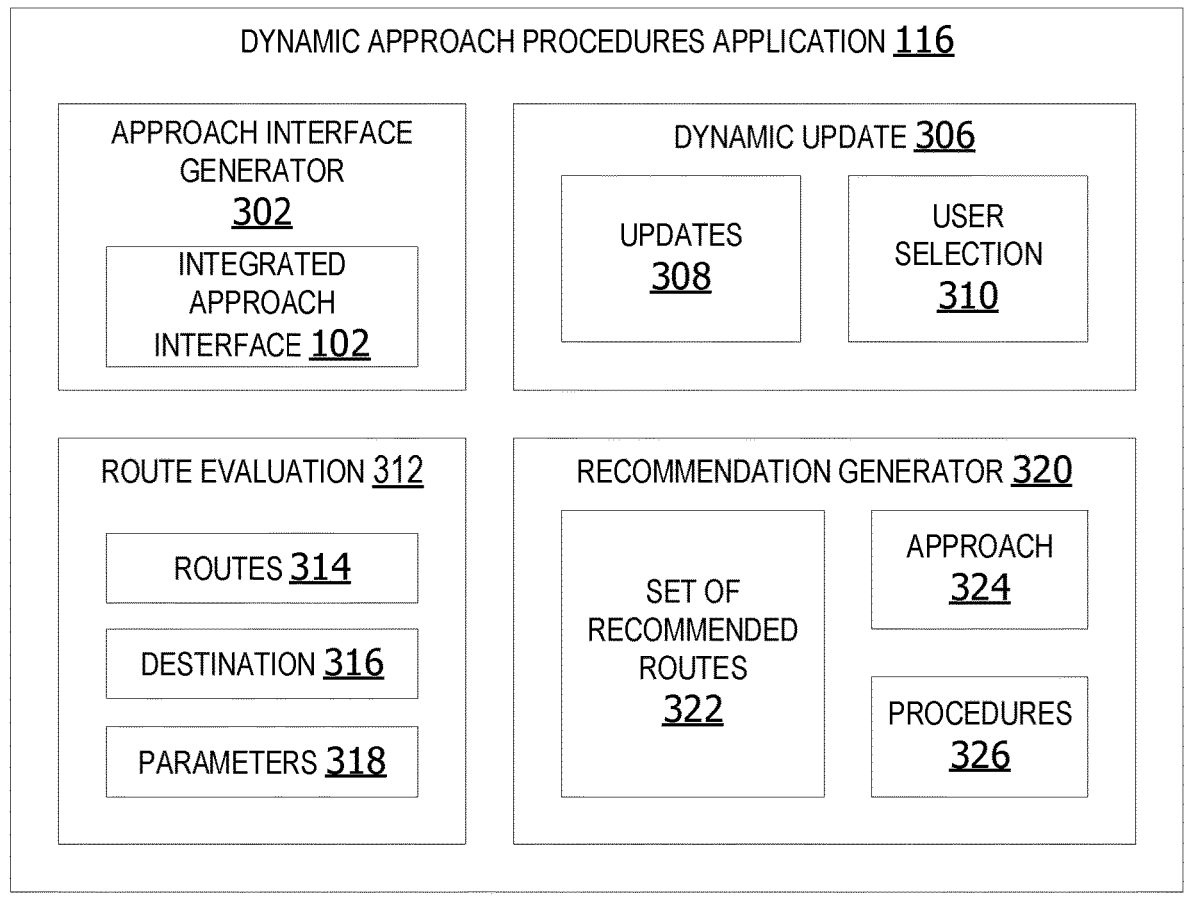
FIG. 3 is a block diagram illustrating a dynamic approach procedures application generating integrated terminal approach data according to an implementation.

FIG. 3 illustrates the dynamic approach procedures application 116 configured to generate integrated terminal approach data which is displayed within an integrated approach interface. In this non-limiting example, the dynamic approach procedures application 116 includes an approach interface generator 302. The approach interface generator 302 is a software component which analyzes and integrates terminal approach data with aircraft data, airport data and other dynamic data to generate the integrated approach interface 102. The integrated approach interface 102 provides approach data associated with multiple airports, routes, approaches and other data in an integrated fashion, such that all the information desired or required by a pilot is available within a single source, namely the integrated approach interface 102.

A dynamic update component 306 (e.g., software component) receives real-time updates 308, such as weather updates and other dynamic data describing changing conditions within an airport and around an airport, which may require an update to the integrated approach interface 102. The dynamic update component 306 updates the information displayed within the integrated approach interface to reflect changes in weather, routes or approaches which may be available or unavailable due to the changes, etc.

Likewise, if a user makes a user-selection 310 of a route from a set of two or more possible routes to a destination airport, the integrated approach interface is updated by the dynamic update component 306 to highlight information associated with the user selections and remove any data which has become irrelevant given the user selections.

A route evaluation component 312 (e.g., software component) identifies all routes 314 into a selected destination 316 airport. The possible routes are displayed to the user within the integrated approach interface 102. The dynamic approach procedures application 116 in some examples applies one or more parameters 318 to the terminal approach data to identify possible routes from the user's departure airport into the destination airport. For example, a parameter may specify that if data indicates a runway is closed due to icy weather conditions, that route will be removed from the list of possible routes available to the user.

In other examples, the dynamic approach procedures application 116 includes a recommendation generator 320. The recommendation generator 320 is a software component in one example that optionally generates one or more recommendations for a user. In this non-limiting example, the recommendation generator 320 generates a set of one or more recommended routes 322 into a selected destination airport. In this example, the integrated approach interface can be updated to provide route information for the recommended routes, while removing information associated with unrecommended routes from the map and/or the side bar.

The recommendation generator 320 in other examples can recommend an approach 324 and/or one or more procedures 326 associated with one or more airports. The recommendations can be displayed to the user via the map interface or via the side bar. The displayed terminal procedure information, in some examples, supports the pilot's workflow.

Figure 4:
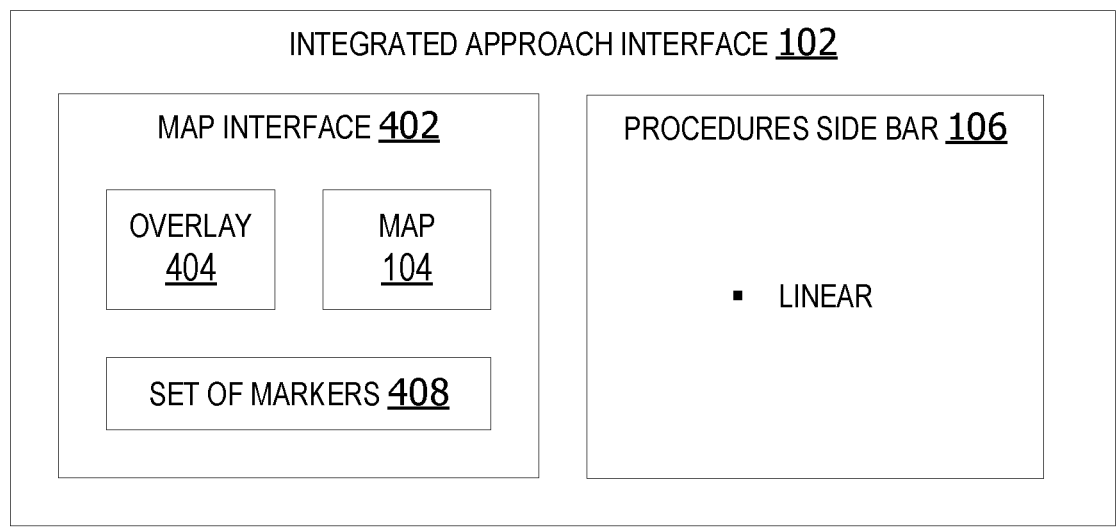
FIG. 4 is a block diagram illustrating an integrated approach interface, including a map interface and a procedural side bar according to an implementation.

FIG. 4 schematically illustrates an integrated approach interface 102 including a map interface 402 and a procedural side bar 106. The map interface 402 provides a user interface including the map 104 having an overlay 404 presenting approach procedures data to the user. The overlay 404 in some examples includes route identifiers, waypoint identifiers and other symbols providing approach procedures data to the user.

The map 104 optionally includes a set of markers 408 identifying approach procedure-related data to the user. The set of markers 408 can include markers such as, but not limited to, approach speed markers, speed restriction markers, minimum altitude markers, maximum altitude markers, an initial approach fix (IAF), a final approach fix (FAF), altitude restrictions at the different fixes, missed approach markers, etc.

In other examples, the procedures side bar 106 includes terminal approach procedures information arranged in a linear, hierarchical format. However, the examples are not limited to hierarchical formats. In other examples, the approach procedures information can be presented within the procedures side bar 106 in any other format.

Figure 5:
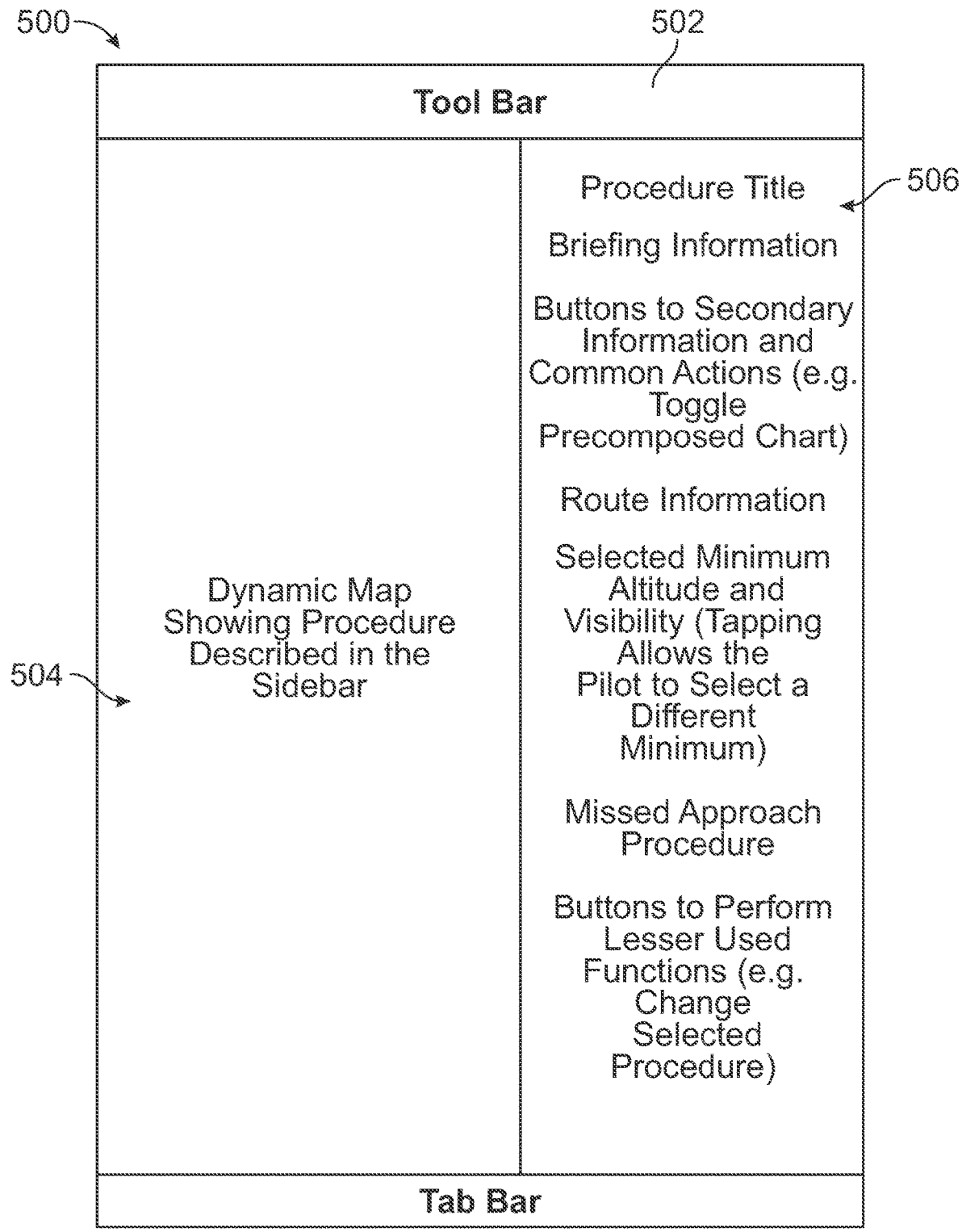
FIG. 5 is a block diagram illustrating a user interface display layout for the integrated approach information according to an implementation.

FIG. 5 schematically illustrates a user interface display layout 500 for the integrated approach interface. The user interface display layout 500 is an example of a layout for customized terminal approach information presented within a user interface device for utilization by a user. In this example, the user interface display layout 500 includes a tool bar 502. The tool bar 502 optionally includes one or more controls for selecting display options within the user interface. For example, the tool bar 502 can include options for selecting flight plan data for display, procedures data for display, etc.

A dynamic map 504 is a map display for showing the procedure described in the sidebar 506. The map display in other examples presents route information, locations of airports, waypoints, or other approach-related data.

The side bar 506 presents procedure information in a linear table view. In this example, the side bar 506 includes a procedure title identifying the procedure, briefing information, buttons to secondary information and common actions, route information, selected minimum altitude and visibility. The side bar 506 includes selectable options, for example, by selecting a different minimum (e.g., tapping a touchscreen allows the pilot to select a different minimum). The side bar 506 also optionally includes missed approach procedures and/or buttons to perform lesser used functions in some examples. The lesser used functions can include change selected procedure or other procedures.

In some examples, the user's selected path (approach) into the destination airport is shown on the map 104 with the side bar 506 including additional information for the path, such as missed approach information. If the pilot gets down to the minimum altitude for the selected approach procedure, but does not see the runway, the pilot has to come back around and try again. In such cases, the map 104 dynamically updates to show the missed approach path overlaid on the map 104 automatically. This assists the pilot in seamlessly reacting to changing conditions during flight.

Figure 6:
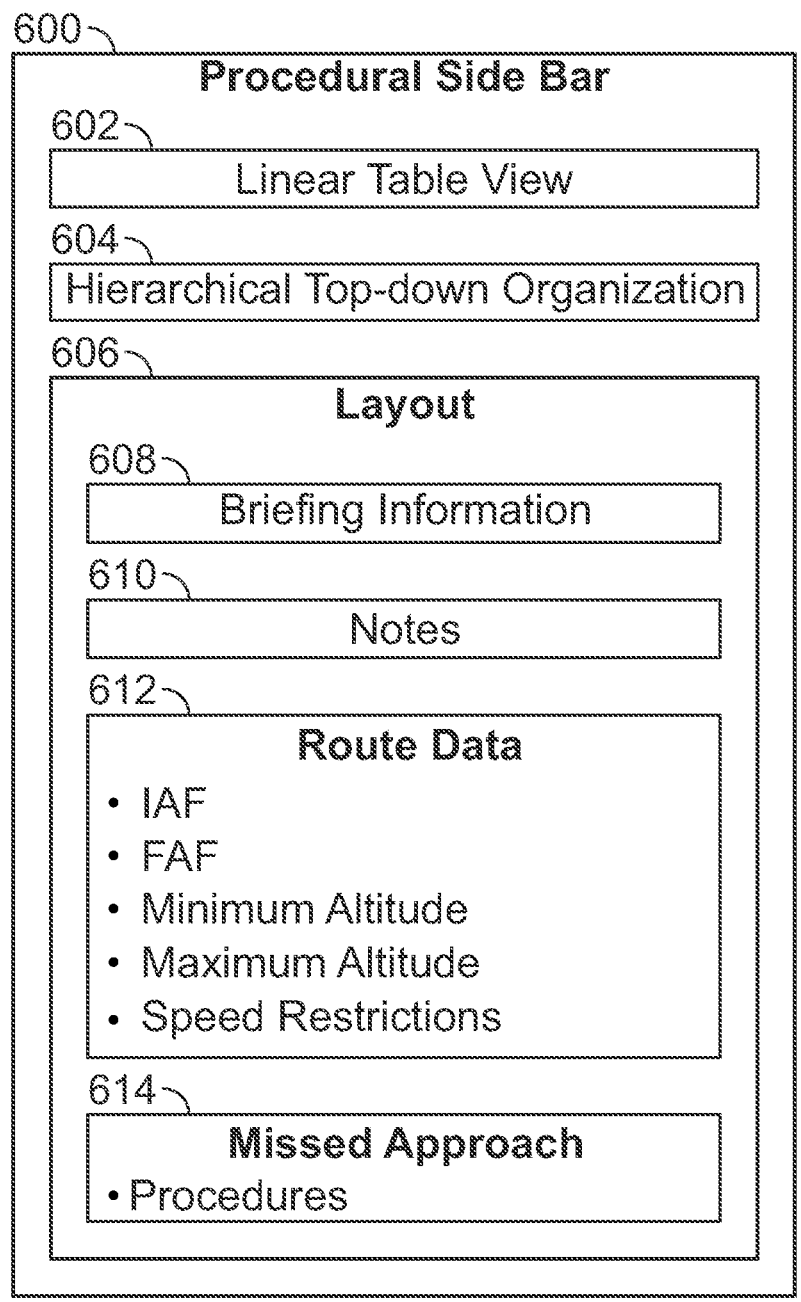
FIG. 6 is a block diagram illustrating a procedural side bar including information associated with an approach procedure according to an implementation.

FIG. 6 schematically illustrates a procedural side bar 600 including information associated with an approach procedure. In this non-limiting example, the procedural side bar 600 includes information presented in a linear table view 602 with a hierarchical top-down organization of the information.

The layout 606 in some examples includes briefing information 608 associated with a selected procedure. Notes 610 describe aspects of the procedure and other additional information that are applicable to the procedure represented in the terminal approach map or side bar. Route data 612 includes information associated with the procedure, such as, but not limited to, IAF, FAF, minimum altitude, maximum altitude and/or speed restrictions. Other information can be displayed. The procedural side bar 600 in other examples includes missed approach information 614 (e.g., missed approach procedures) that can be provided, for example, if an attempted approach is missed.

Figure 7:
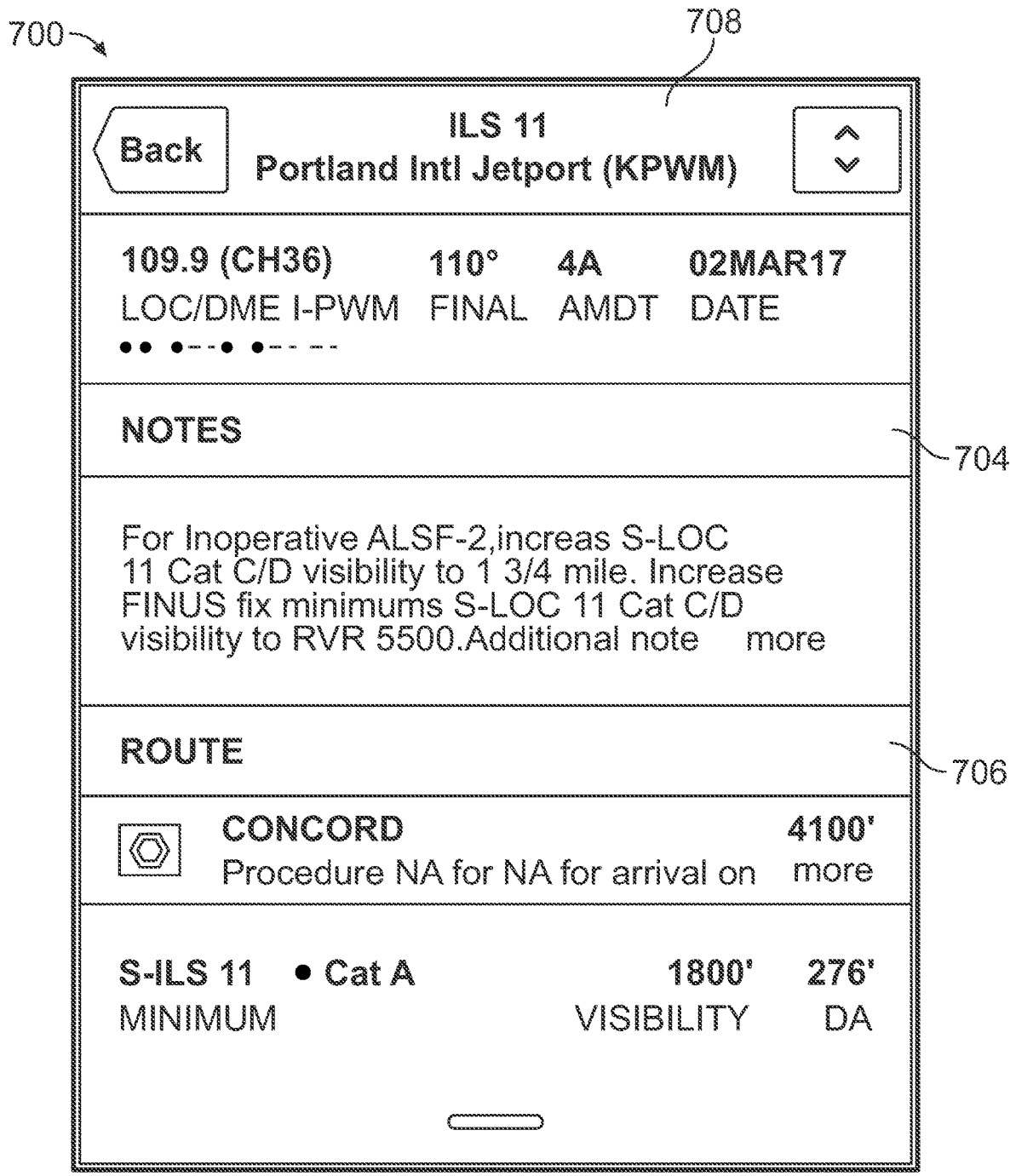
FIG. 7 is a block diagram illustrating a sidebar with notes according to an implementation.

FIG. 7 illustrates a side bar 700 with notes 704. The side bar 700 is a procedural side bar, such as, but not limited to, the side bar 106 in FIG. 1. A procedure title 708 indicates an instrument landing system (ILS) 11. The notes 704 contain additional information regarding the procedure. The side bar 700 in this example also includes route data 706 associated with the procedure.

Figure 8:
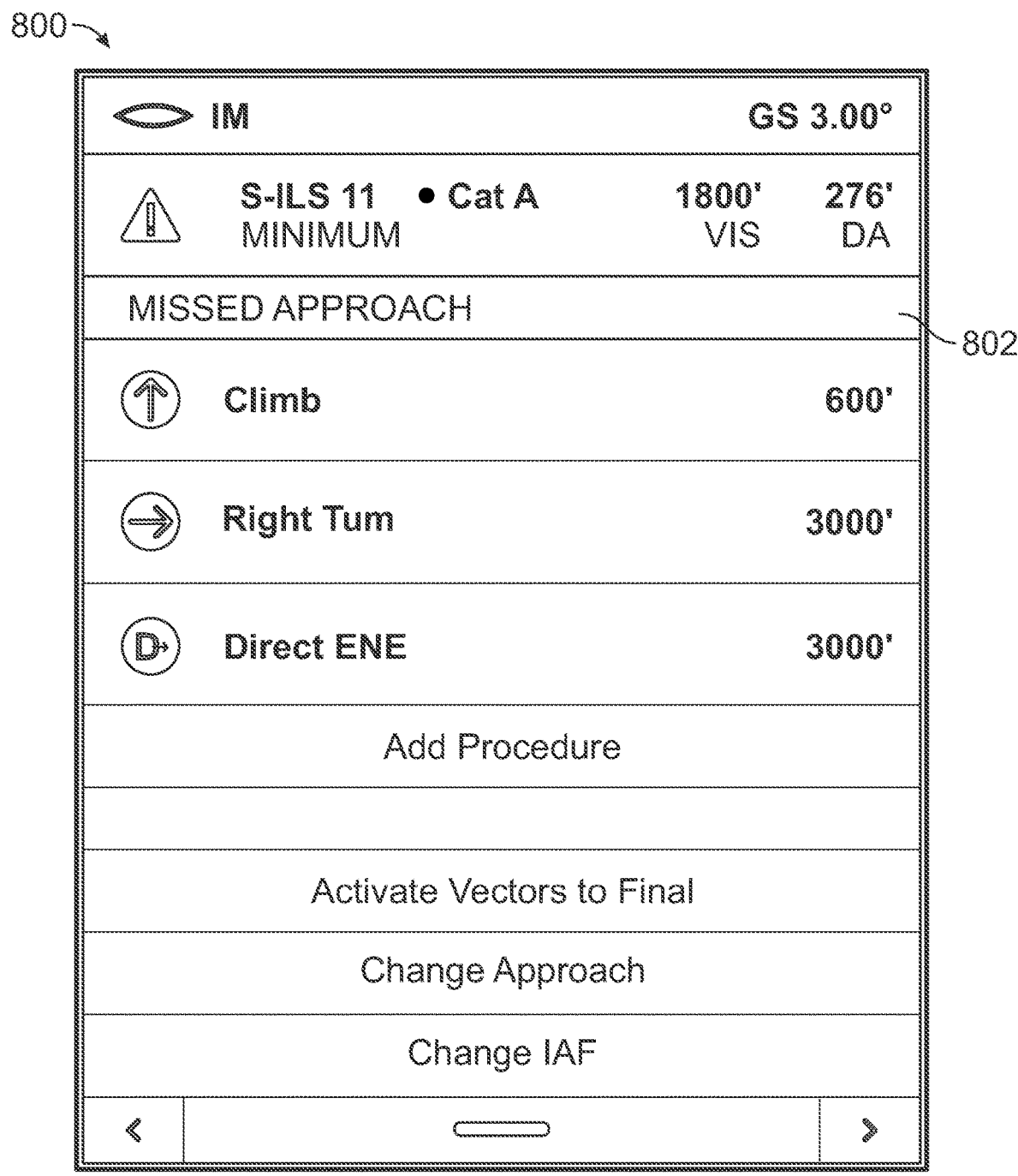
FIG. 8 is a block diagram illustrating an expandable side bar according to an implementation.

FIG. 8 illustrates an expandable side bar 800. The side bar 800 is a procedural side bar, such as, but not limited to, the side bar 106 in FIG. 1. The side bar 800 in this example is capable of expanding to provide additional details regarding a procedure. In this example, the additional details includes a missed approach procedure 802 (e.g., a step-by-step procedure that includes text and graphics). Additional options can be selected, such as to add a procedure, activate certain vectors, change the approach, of change the IAF, among others.

Figure 9:
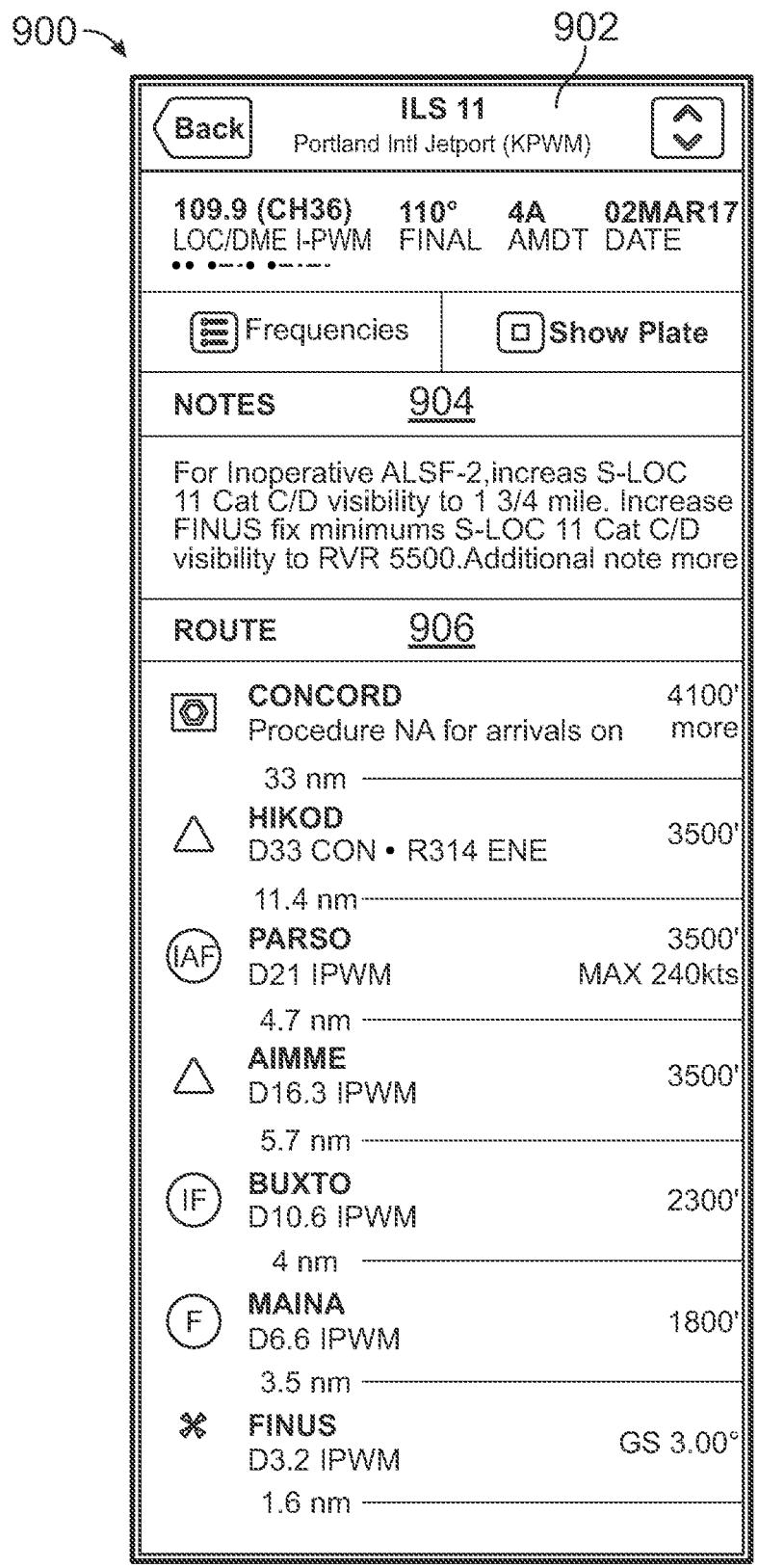
FIG. 9 is a block diagram illustrating an extended side bar with selected approach according to an implementation.

FIG. 9 illustrates an extended side bar 900 with selected approach information displayed. The side bar 900 is a procedural side bar, such as, but not limited to, the side bar 106 in FIG. 1. In this example, the side bar 900 is capable of extending (e.g., providing an extended display or user interface) to accommodate additional information associated with a selected approach. In this example, the procedure title 902 indicates an instrument landing. The extended side bar 900 includes notes 904 (e.g., a section with notes for the approach) and information for the route 906 (e.g., route information in a linear format that includes text and graphics).

Figure 10:
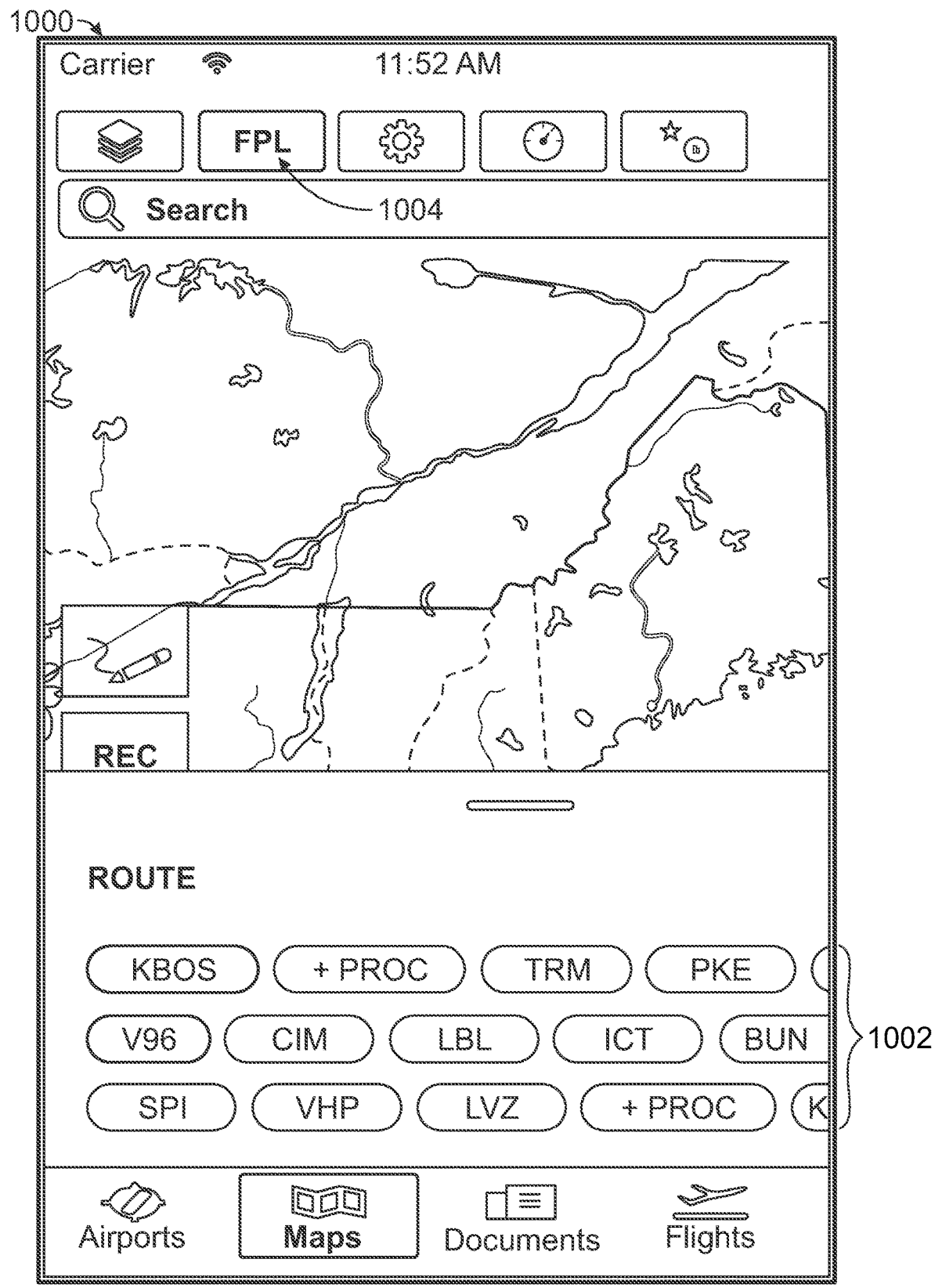
FIG. 10 is a block diagram illustrating an approach map workflow according to an implementation.

FIGS. 10-20 will now be described. These figures illustrate different display and user interface configurations, such as at different stages in preflight or during flight. More particularly, FIG. 10 illustrates an approach map workflow flight plan presented within a side bar 1000. The side bar 1000 is a procedural side bar, such as, but not limited to, the side bar 106 in FIG. 1. The side bar 1000 in this example presents possible routes 1002 associated with a flight plan 1004. The user can select a route from the set of possible routes using the tool bar. That is, an interactive map is displayed that allow for dynamic selection and updating of possible routes 1002 associated with the flight plan 1004. It should be noted that the display properties, such as brightness, scale, etc. can be adjusted as desired or needed. The adjustments can be made to the different displays and user interfaces described herein.

Figure 11:
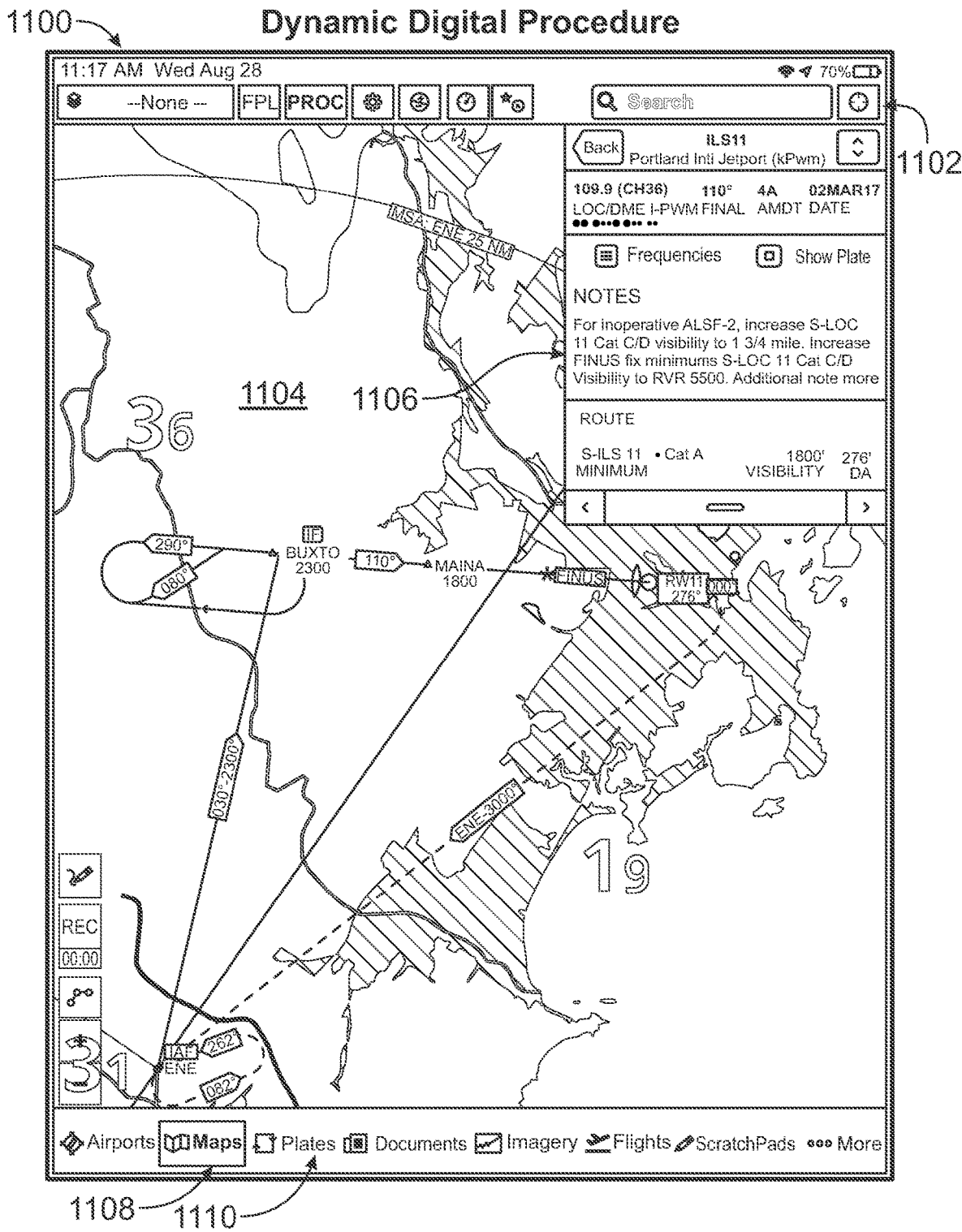
FIG. 11 is a block diagram illustrating an integrated approach user interface for a dynamic approach procedure according to an implementation.

FIG. 11 illustrates an integrated approach interface 1100 for a dynamic approach procedure. The integrated approach interface 1100 is a digital approach interface, such as, but not limited to, the integrated approach interface 102 in FIG. 1. In this non-limiting example, the integrated approach interface 102 includes a tool bar 1102, a map 1104 and a side bar 1106. In other examples, a tool bar having selectable tabs can optionally also be provided. In this example, a tab for maps 1108 is selected to trigger display of the map 1104. The user can select the plates 1110 tab to trigger display of the procedure data within a different plate interface rather than in the map interface, as is shown in FIG. 11. The plate interface presents the approach information in a different format, such as in a terminal approach plate-type of format. However, the examples are not limited to providing a plate interface. In other examples, a plate interface may not be provided. Other electable tabs can also be provided within the interface.

Figure 12:
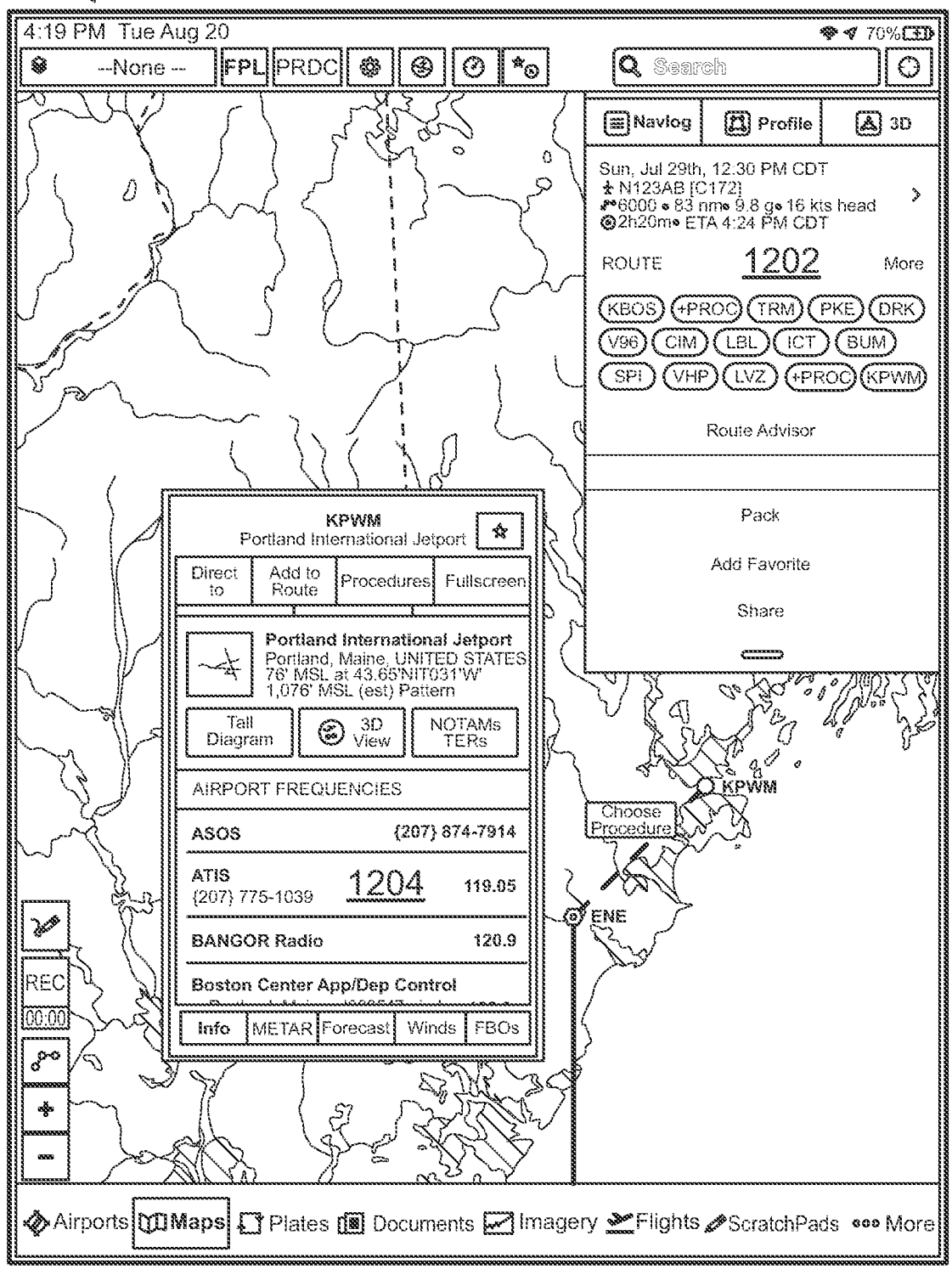
FIG. 12 is a block diagram illustrating an integrated approach user interface, including an airport popover according to an implementation.

FIG. 12 illustrates an integrated approach interface 1200 including an airport popover. The integrated approach interface 1200 is a digital approach interface, such as, but not limited to, the integrated approach interface 102 in FIG. 1. In this non-limiting example, the user can open (e.g., select on the user interface) a procedure side bar 1202 for the airports in the flight plan by tapping on the procedure button or tapping the dashed line completing the route from the point of departure to the destination airport. It should be noted that "tapping" refers to a user touching the user interface make the selection, such as on a touchscreen display. However, other input devices and means are contemplated, including other touch capable and non-touch capable inputs. The procedure side bar 1202 for any airport may be selected (e.g., opened) by tapping the procedures button in an airport popover 1204 (e.g., an overlaid information box).

Figure 13:
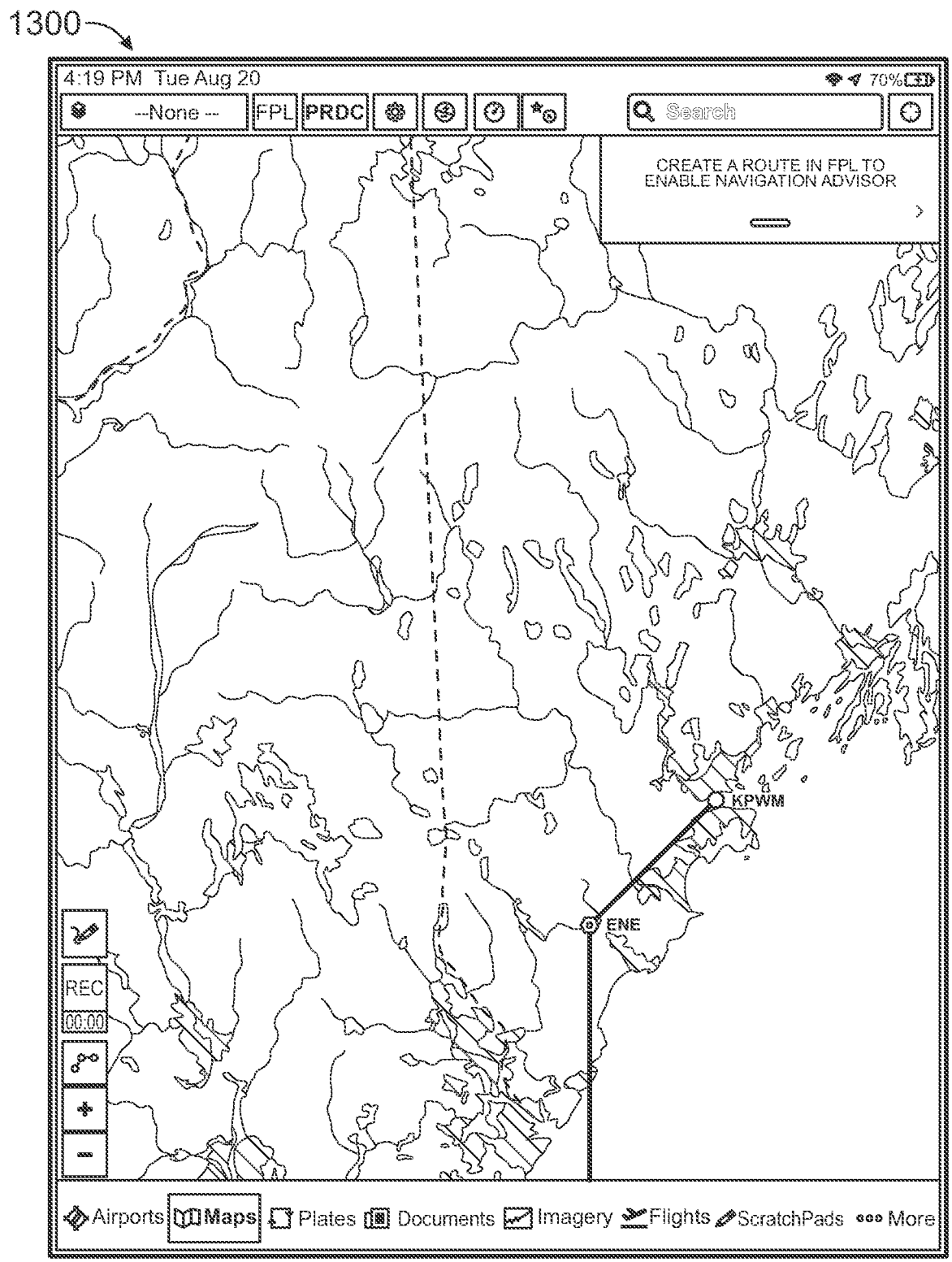
FIG. 13 is a block diagram illustrating an integrated approach interface having no route loaded according to an implementation.

FIG. 13 illustrates an integrated approach interface 1300 having no route loaded. The integrated approach interface 1300 is a digital approach interface, such as, but not limited to, the integrated approach interface 102 in FIG. 1. In this non-limiting example, the user has not yet selected or loaded a route. As such, there is no route-related information to display in the side bar. The user can create a route in a flight plan to enable the navigator advisor and/or populate the side bar with procedure-related information for the route. As described herein, this selection process and display of information is dynamically updated and can include automated modifications in some examples.

Figure 14:
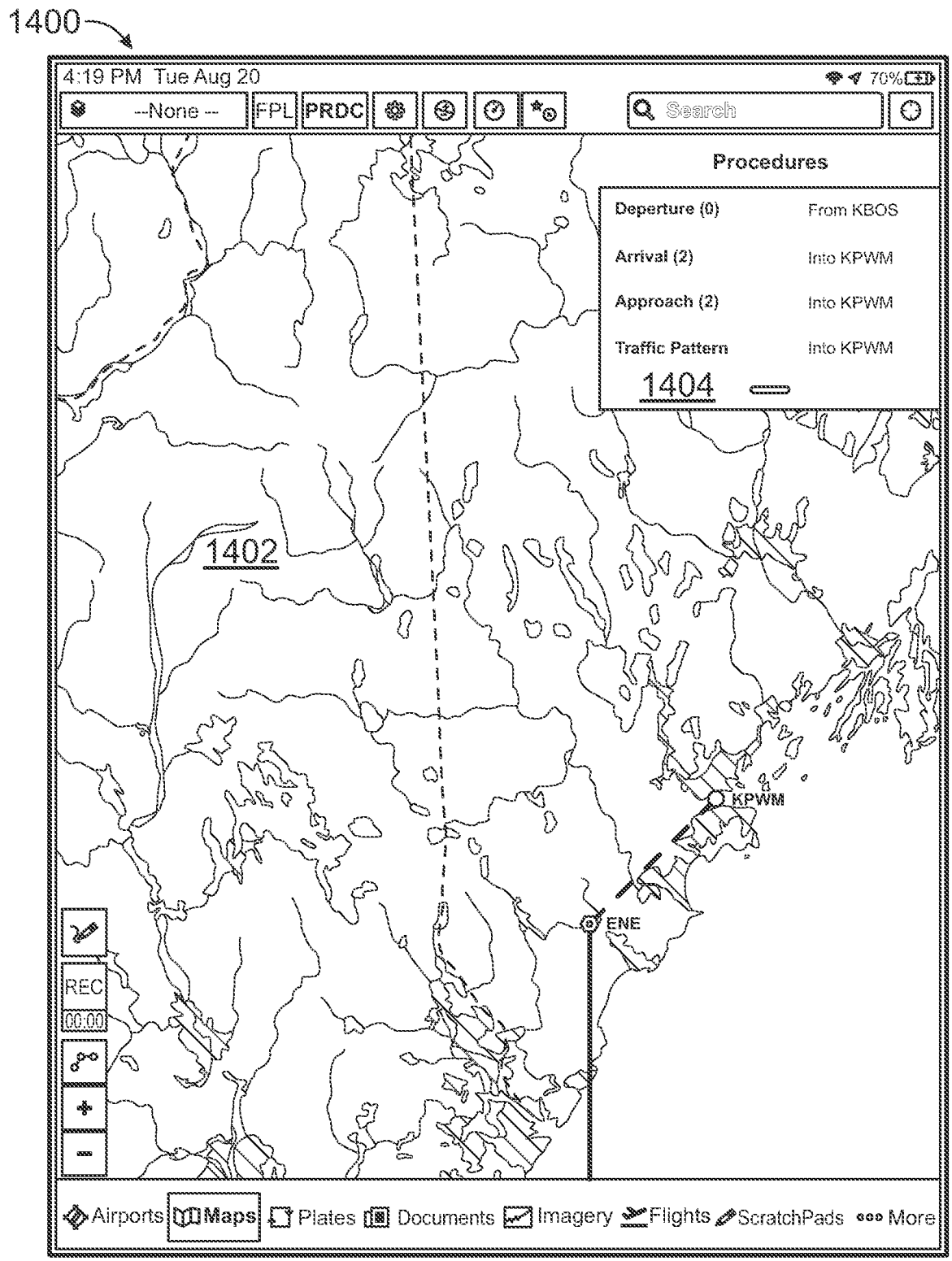
FIG. 14 is a block diagram illustrating an integrated approach interface having a user-selected route loaded according to an implementation.

FIG. 14 illustrates an integrated approach interface 1400 having a user-selected route loaded. The integrated approach interface 1400 is a digital approach interface, such as, but not limited to, the digital approach interface 102 in FIG. 1. The integrated approach interface includes a map 1402 and a linear side bar 1404. In this example, the user is presented with a list inside the side bar 1404 to start a procedure selection for the departures at the airport, arrivals, approaches, and traffic patterns into the destination airport.

Figure 15:
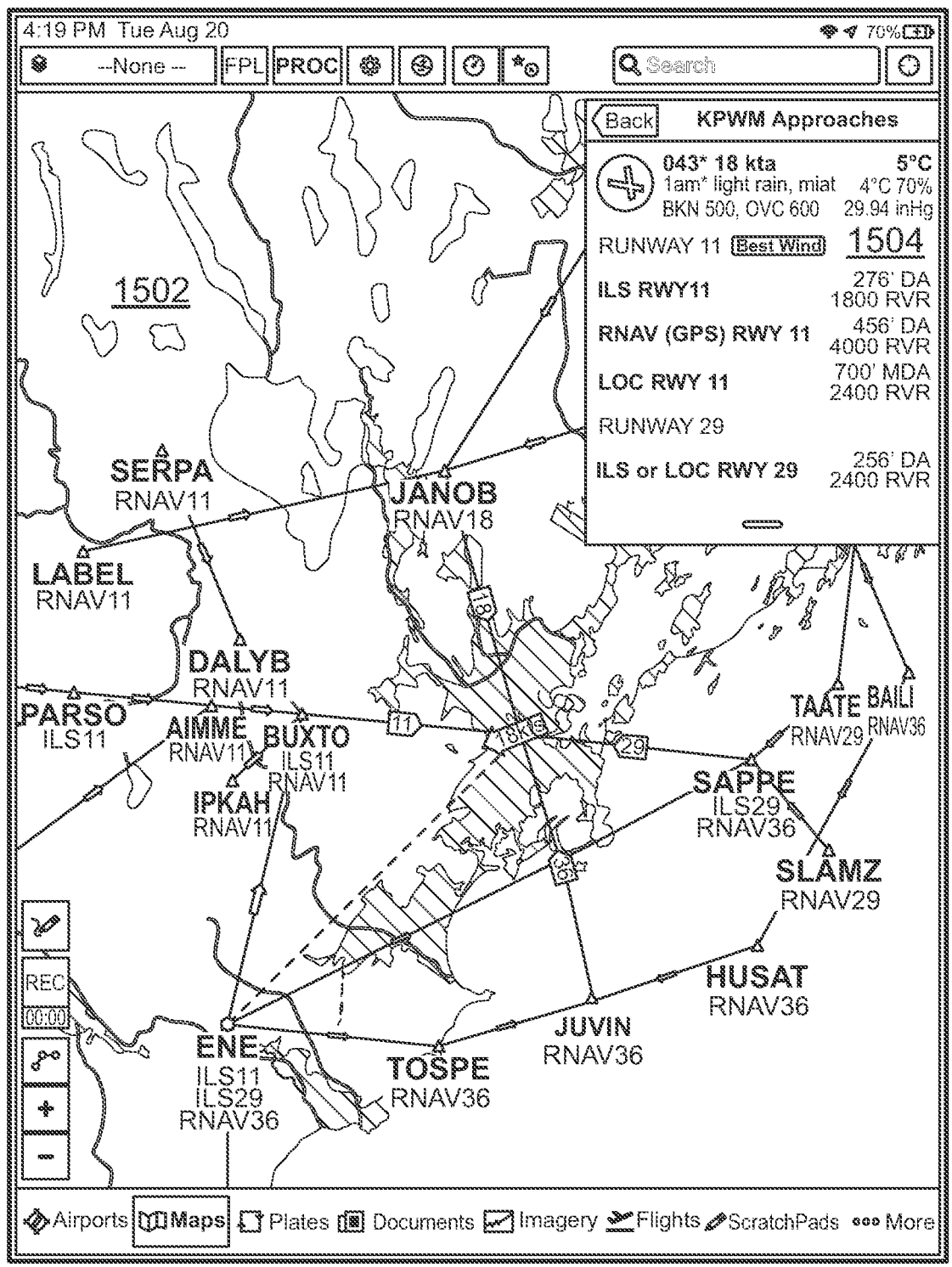
FIG. 15 is a block diagram illustrating an integrated approach interface including approach paths associated with the loaded route according to an implementation.

FIG. 15 illustrates an integrated approach interface 1500 including approach paths associated with the loaded route. The integrated approach interface 1500 is a digital approach interface, such as, but not limited to, the integrated approach interface 102 in FIG. 1. In this non-limiting example, the user selected approaches are shown as an overlay on the map 1502. In the overlay, the various possible approach paths for an aircraft flying into a selected airport are represented. The approaches are also listed in the side bar 1504 with the latest weather information associated with the airport and/or the region around the airport to assist the user in deciding which approach into the airport to choose. That is, relevant weather information is displayed and dynamically updated as described herein.

In this example, the lowest minimum altitude for an approach is highlighted to indicate the current ceiling to too low to fly the approach. For example, the approach is highlighted in color, such as in red. However, the examples are not limited to highlighting in red. In other examples, the approach can be highlighted in yellow, orange, or any other color. In still other examples, the approach information in the side bar 1504 can be highlighted by underlining, using bold text, all caps, or any other method of highlighting information. The user, in yet other examples, selects an approach from the side bar 1504 or directly from the map 1502.

Figure 16:
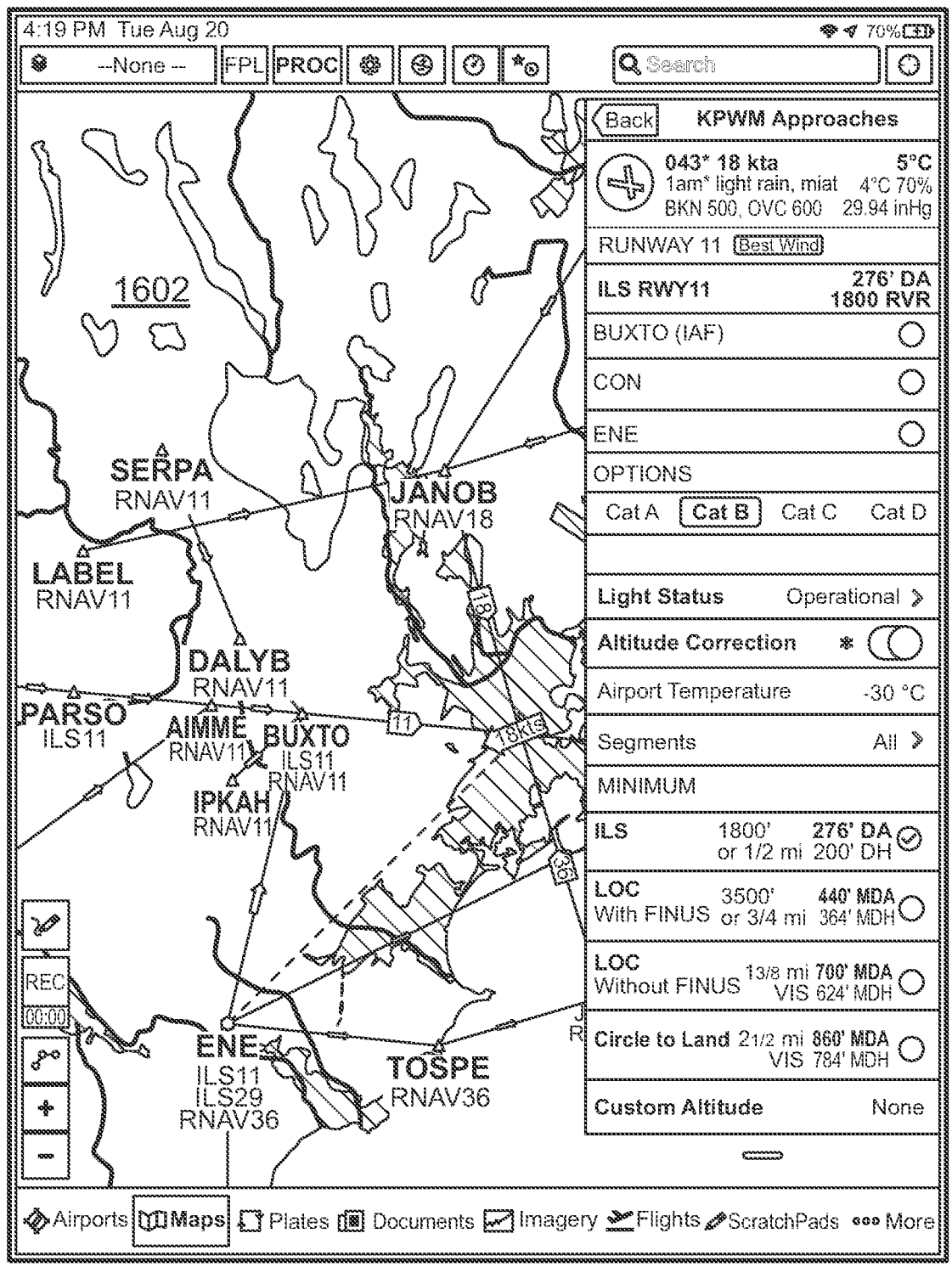
FIG. 16 is a block diagram illustrating an integrated approach interface including an extended side bar according to an implementation.

FIG. 16 illustrates an integrated approach interface 1600 including an extended side bar 1602. The integrated approach interface 1600 is a digital approach interface, such as, but not limited to, the integrated approach interface 102 in FIG. 1. This non-limiting example shows an integrated approach interface 1600 during an intermediate stage of user-selection of an approach from a plurality of possible approaches listed in the side bar 1602. That is, the user-selection of the approach is not complete at this stage.

Figure 17:
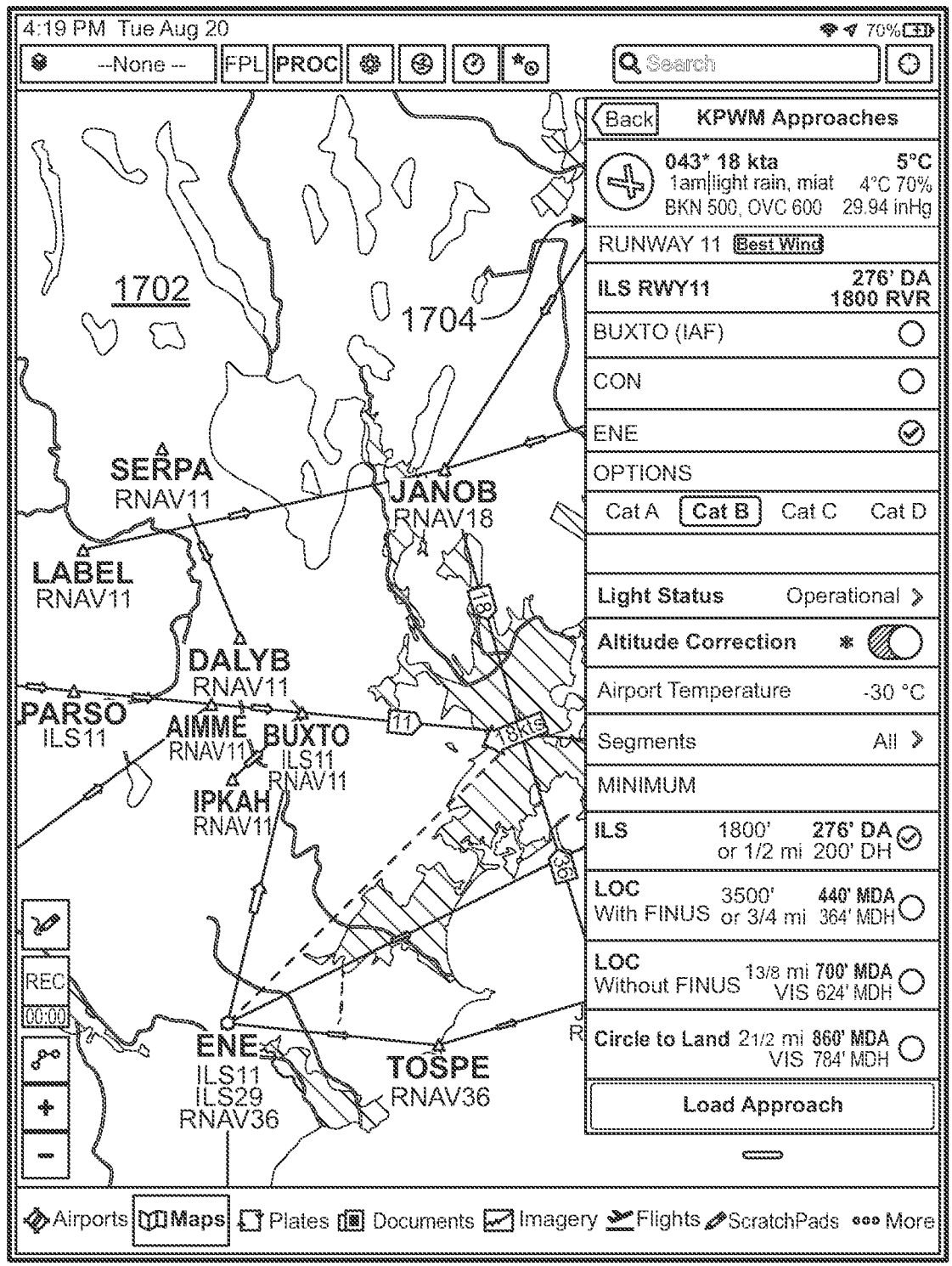
FIG. 17 is a block diagram illustrating an integrated approach interface including a loaded route according to an implementation.

FIG. 17 illustrates an integrated approach interface including a loaded route. The integrated approach interface 1700 is a digital approach interface, such as, but not limited to, the integrated approach interface 102 in FIG. 1. The integrated approach interface 1700 shows an intermediate stage of procedure selection, narrowing down a feeder route to the final approach through a map 1702 or side bar 1704. That is, the integrated approach interface 1700 includes more focused information in the display.

Figure 18:
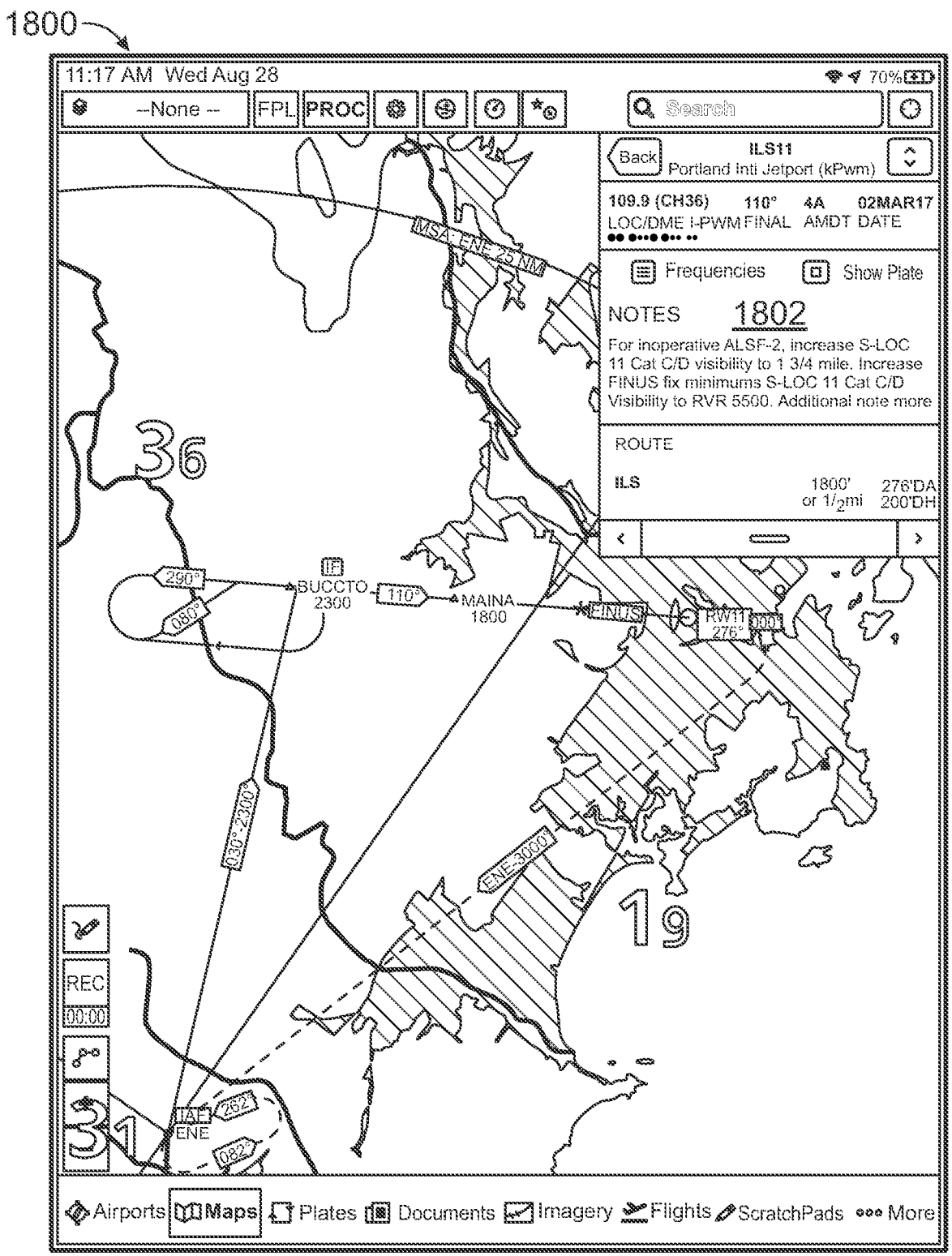
FIG. 18 is a block diagram illustrating an integrated approach interface including a loaded route and notes in the side bar associated with the loaded route according to an implementation.

FIG. 18 illustrates an integrated approach interface 1800 including a loaded route and notes 1802 in the side bar associated with the loaded route. The integrated approach interface 1800 is a digital approach interface, such as, but not limited to, the integrated approach interface 102 in FIG. 1. In this non-limiting example, the instrument landing system (ILS 11) into the selected airport (KPWM) is loaded with the ENE initial approach fix. Only the minimum altitude and notes for this specific approach are displayed, substantially reducing clutter within the integrated approach interface 1800 displayed by the user interface as compared to precomposed (static) terminal approach plates. That is, a more easily readable and comprehendible user interface and display are provided. In some examples, the type of information, quantity of information, granularity of information, etc. is user selectable and/or can be automatically populated and modified by the user.

Figure 19:
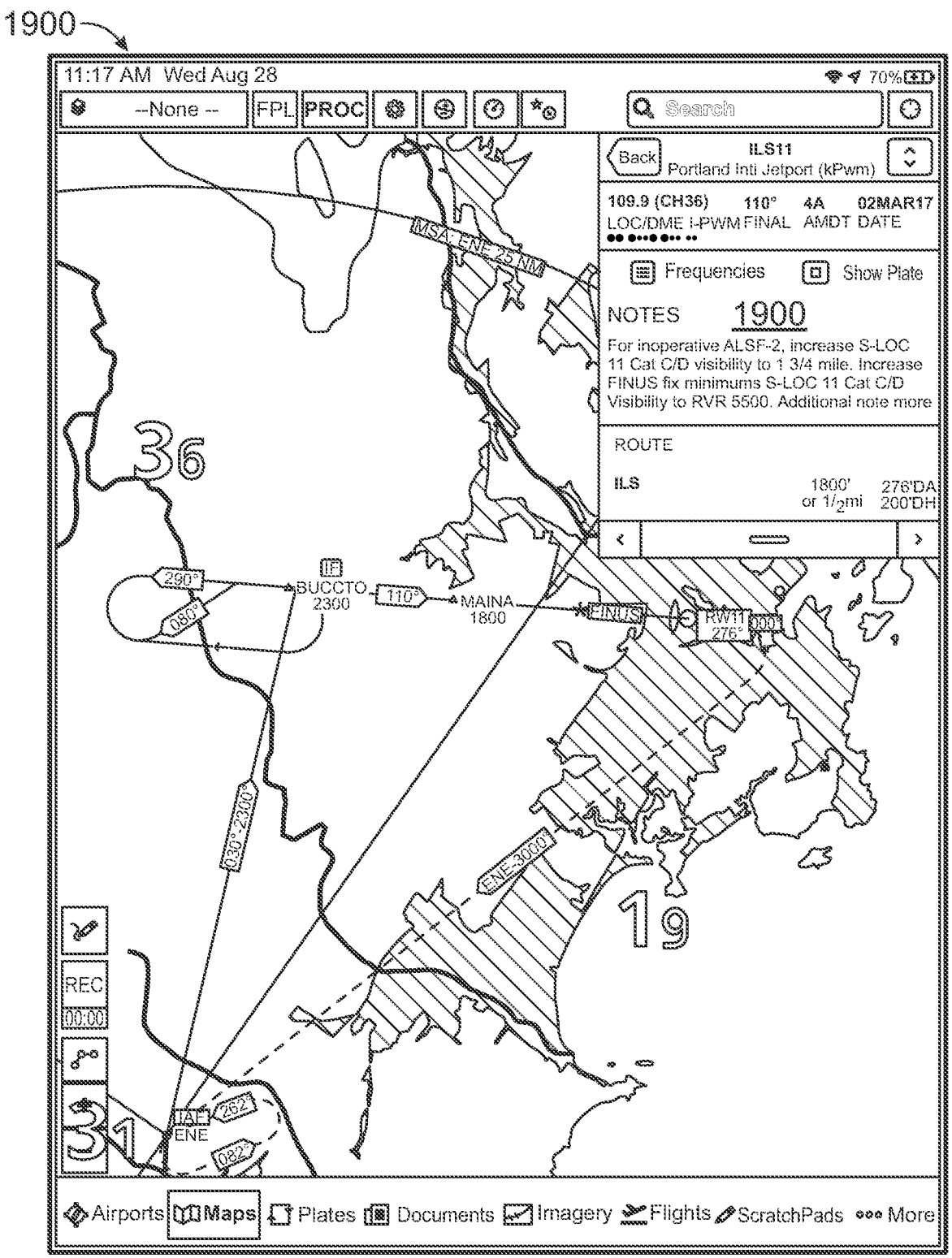
FIG. 19 is a block diagram illustrating an integrated approach interface including an expanded side bar according to an implementation.

FIG. 19 illustrates an integrated approach interface 1900 including an expanded side bar 1902. The expanded side bar 1902 presents information associated with the selected approach into the destination airport. The integrated approach interface 1900 is a digital approach interface, such as, but not limited to, the integrated approach interface 102 in FIG. 1. In this example, the expanded side bar 1902, while providing additional information, still has a simplified and less cluttered view.

Figure 20:
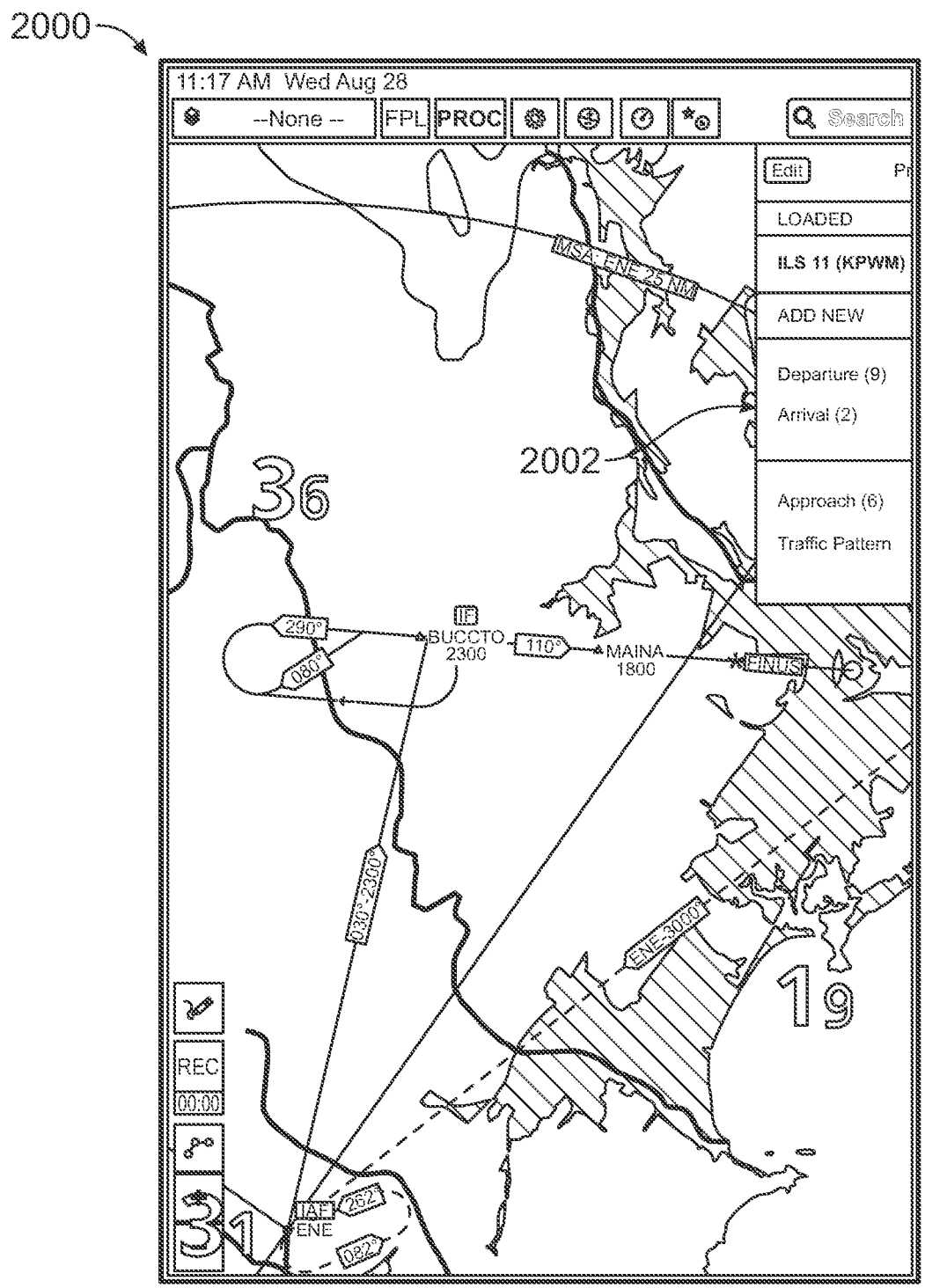
FIG. 20 is a block diagram illustrating an integrated approach interface including information associated with a user-selected approach procedure into a destination airport according to an implementation.

FIG. 20 illustrates an integrated approach interface 2000 including information associated with a user-selected approach procedure into a destination airport. The integrated approach interface 2000 is a digital approach interface, such as, but not limited to, the integrated approach interface 102 in FIG. 1. In this example, the side bar 2002 includes a number of departures, arrivals, approaches, and traffic patterns for the destination airport. In an example scenario, a user flying to a destination airport can tap a procedure button on the integrated approach interface to choose an approach from a list of all possible approaches into the destination airport. The system combines the terminal approach interface data with the approach path superimposed or overlaid on top of the terminal approach interface data. The user selects a process and adds the process to the route. The approach can be selected from the map view or from the side bar 2002.

In other examples, the system enables a user to select an approach for a runway. The system applies filters to narrow down the minima needed for the approach they are flying. This reduces the number of possible approaches for evaluation. For example, a set of fifteen possible approaches may be filtered down to four approaches. It should be appreciated that the filtering properties and criteria can be modified or adjusted, such as by a user, based on flying conditions, etc.

In other examples, the integrated approach interface 2000 is updated in flight based on dynamic weather data received during flight. That is, received weather information used to update the displayed information. In one example, the NOTAMs are also updated to show pilot-defined information. That is, the updated displays defined, required, or desired information that alerts the pilot to external factors.

Figure 21:
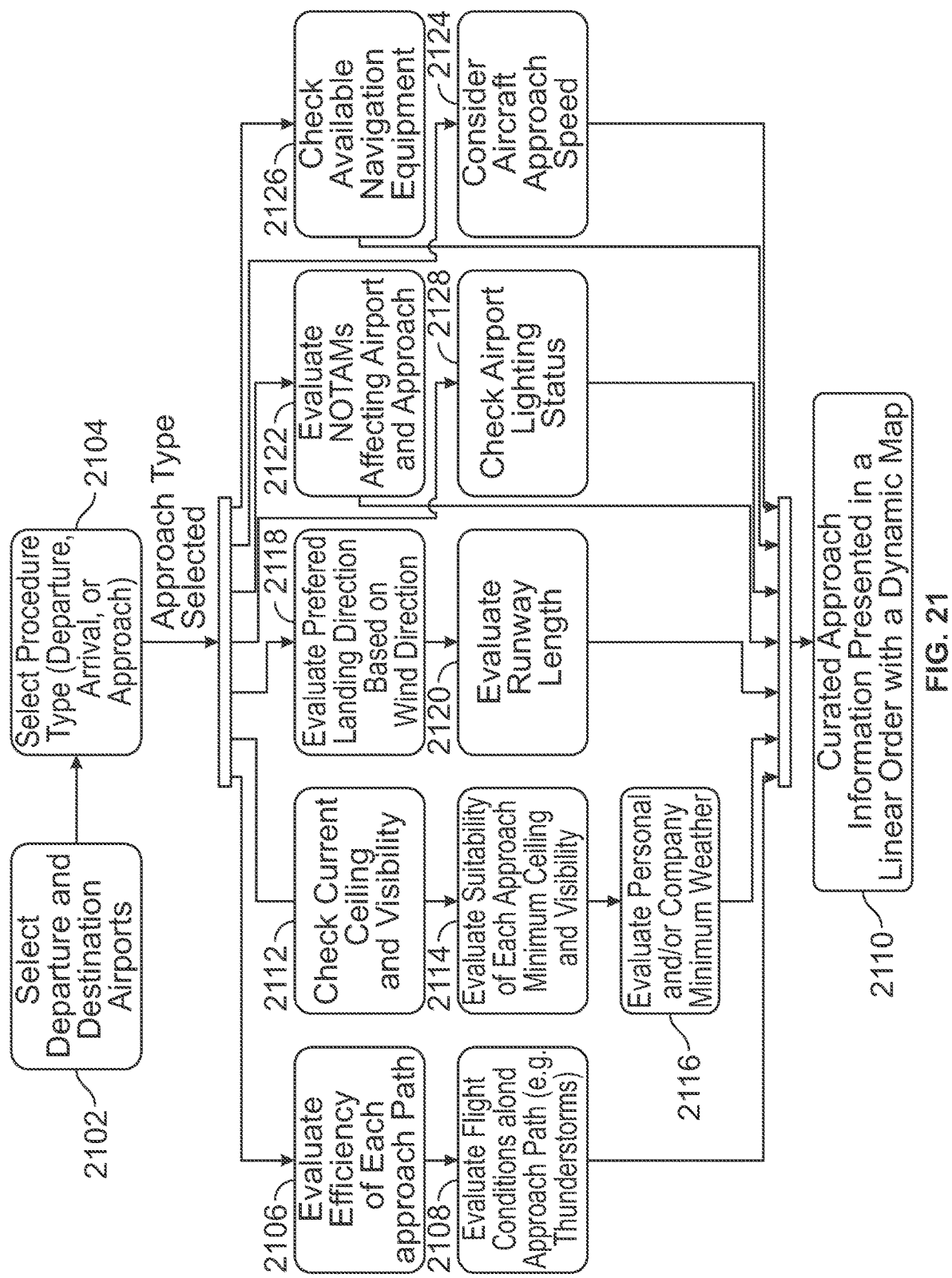
FIG. 21 is a flow interface illustrating an implementation of a dynamic approach procedures application evaluating and curating data for presentation to the user within the integrated approach interface according to an implementation.

FIG. 21 is a flow interface illustrating an implementation of a dynamic approach procedures application evaluating and assimilating data for presentation to the user within the integrated approach interface. In one implementation, the operations illustrated in FIG. 21 are performed, at least in part, by executing instructions by the one or more processors, such as, but not limited to, the processor 110 in FIG. 1.

At operation 2102, the user selects departure and destination airports via the dynamic approach procedures application interface (e.g., using the dynamic approach procedures application 116). The dynamic approach procedures application receives the user selection of procedure type, including departure airport, arrival airport (destination) and approach at operation 2104. It should be noted that other user selections can be made and received that relate to flight planning (e.g., other preflight information).

Once the approach type is selected, the dynamic approach procedures application 116 evaluates the efficiency of each approach path at operation 2106, which can be based on a number of different factors. For example, the dynamic approach procedures application 116 evaluates flight conditions along the selected approach path (e.g., thunderstorms) at operation 2108. The dynamic approach procedures application presents assimilated approach information in a linear order with a dynamic map at operation 2110, such as described in more detail herein.

The dynamic approach procedures application 116 checks current ceiling and visibility at operation 2112 (e.g., determines ceiling and visibility information along the approach path). At operation 2114, the suitability of each approach minimum ceiling and visibility is evaluated (e.g., evaluate feasibility, availability, etc.). The dynamic approach procedures application 116 evaluates personal and/or company minimum weather at operation 2116. For example, information and requirements specific to the particular company that owns the aircraft can be evaluated to determine compliance.

The dynamic approach procedures application 116 evaluates preferred landing directions based on wind direction at operation 2118 (e.g., available landing direction options). The runway length is evaluated at operation 2120 (e.g., different available runway lengths at the destination airport). The airport lighting status is checked at operation 2128 (e.g., current and future lighting conditions at the destination airport). The dynamic approach procedures application 116 evaluates notice to airmen (NOTAMs) affecting airport and approach at operation 2122. The dynamic approach procedures application 116 considers aircraft approach speed at operation 2124 (e.g., available, minimum, and/or maximum approach speeds are identified). Available navigation equipment is checked at operation 2126 (e.g., flight navigation equipment available at the destination airport are identified). This assimilated approach information is presented in the integrated approach interface at operation 2110. That is, the information can be displayed in one or more user interfaces as described herein (see, e.g., FIGS. 10-20).

It should be appreciated that additional or different information can be used by the method described above wherein the dynamic approach procedures application evaluates and assimilates data for presentation to the user within the integrated approach interface. That is, different relevant information can be used to automatically generate the integrated approach interface as described herein.

Figure 22:
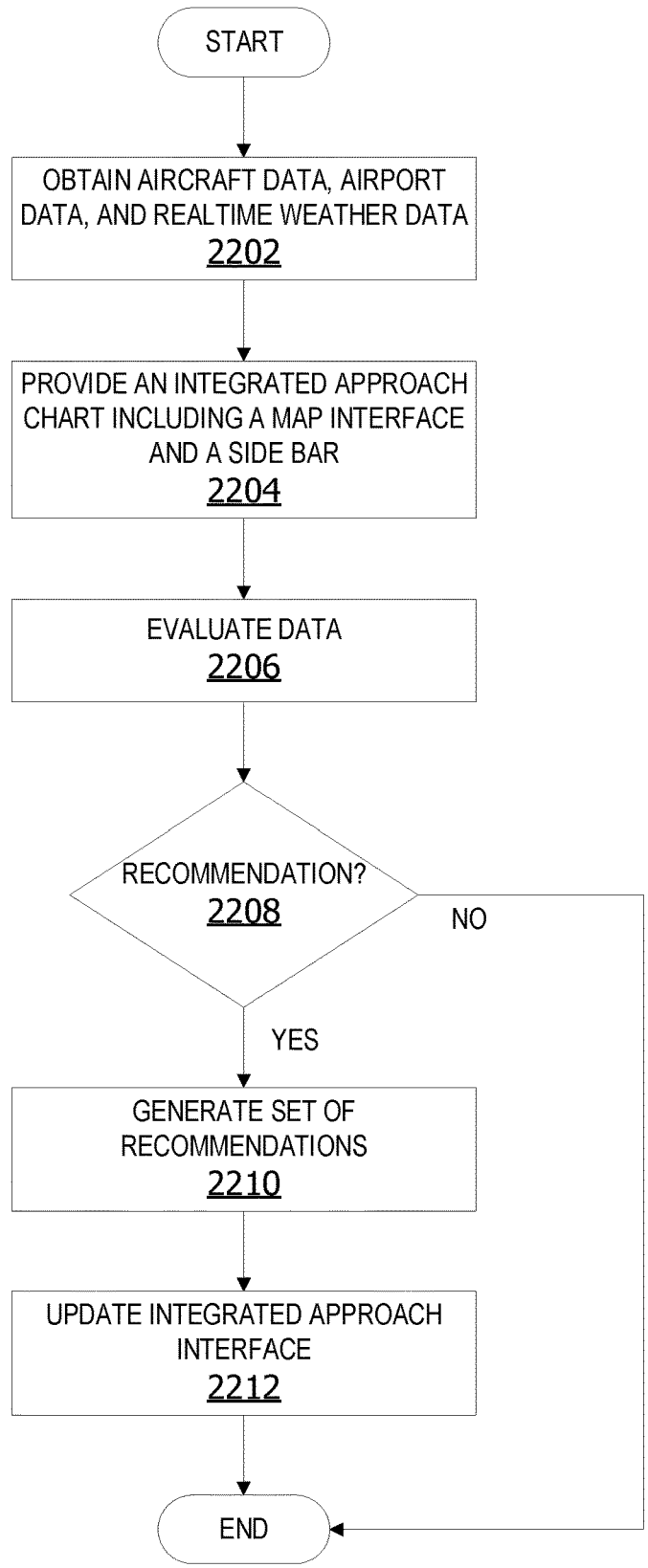
FIG. 22 is a flow interface illustrating an implementation of a dynamic approach procedures application generating a dynamic integrated approach interface according to an implementation.

FIG. 22 is a flow interface illustrating a method 220 for generating a dynamic integrated approach interface, such as by the dynamic approach procedures application 116. In one implementation, the operations illustrated in FIG. 22 are performed, at least in part, by executing instructions by the one or more processors, such as, but not limited to, the processor 110 in FIG. 1.

At operation 2202, aircraft data, airport data and real-time weather data is obtained from a plurality of data sources. That is, flight planning information that can be used and assimilated by the present disclosure is obtained (e.g., obtained automatically from external sources, input by the pilot, etc.). An integrated approach interface, including a map interface and side bar is provided at operation 2204. For example, as described herein, a simplified user interface including a map and side bar having that is more easily interpreted or comprehended is generated. The data is evaluated at operation 2206 (e.g., the flight planning information is analyzed based on flight requirements, aircraft requirements, company requirements, etc.). A determination is made whether to make a recommendation at 2208 (e.g., a determination is made as to whether one or more flight planning options is presented to the user). If yes, the set of recommendations is generated at operation 2210 (e.g., ranked options for flight planning are presented to the pilot). The integrated approach interface is then updated at operation 2212, for example, based on the recommendations. In some examples, the pilot can accept or reject the recommendations.

Figure 23:
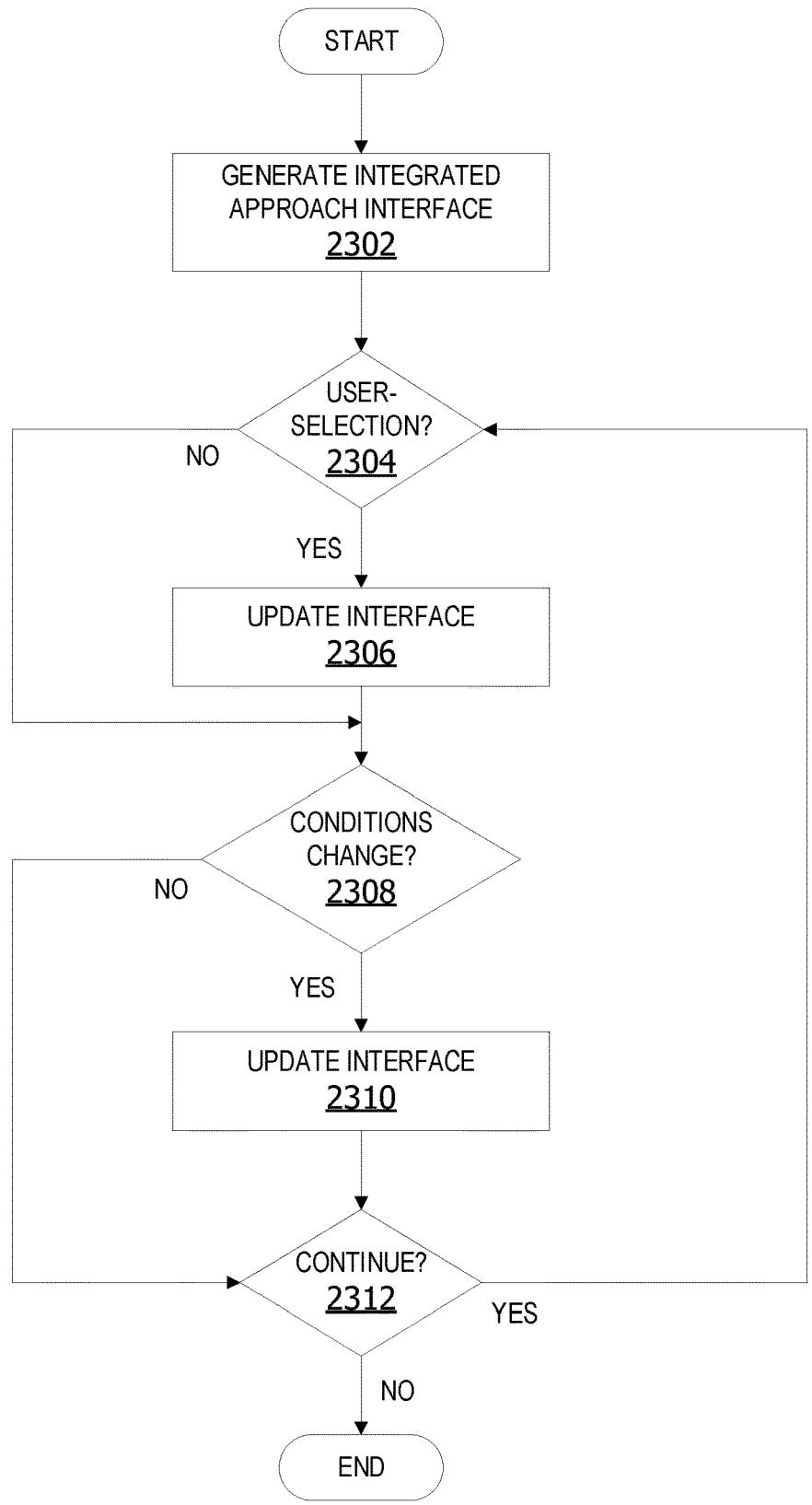
FIG. 23 is a flow interface illustrating an implementation of a dynamic approach procedures application updating an integrated approach interface as changes in weather or other conditions are detected according to an implementation.

FIG. 23 is a flow interface of a method 2300 for updating an integrated approach interface as changes in weather or other conditions are detected, such as by the dynamic approach procedures application 116. In one implementation, the operations illustrated in FIG. 23 are performed, at least in part, by executing instructions by the one or more processors, such as, but not limited to, the processor 110 in FIG. 1.

At operation 2302, an integrated approach interface is generated. For example, one or more displays or user interfaces are generated as described herein. A determination is made whether a user-selection is made at 2304 (e.g., has a user input been received corresponding to a displayed option, feature, etc.). If yes, the integrated approach interface is updated at 2306 (e.g., displayed information is updated). Thereafter, or if there is no user selection, a determination is made whether conditions change at 2308 (e.g., a determination is made based on automatically or manually received information, such as whether or airport information, whether flight, landing or other conditions have changed since the flight plan was generated). If yes, the integrated approach interface is updated at operation 2310 (e.g., the map information, such as overlay information, and/or the side bar information, including the order or configuration of the displayed information is updated). Thereafter, or if conditions have not changed, a determination is made whether to continue at operation 2312. If yes, operations 2304 through 2312 are iteratively executed until a determination is made not to continue at operation 2312. If not, the method 2300 ends.

Figure 24:
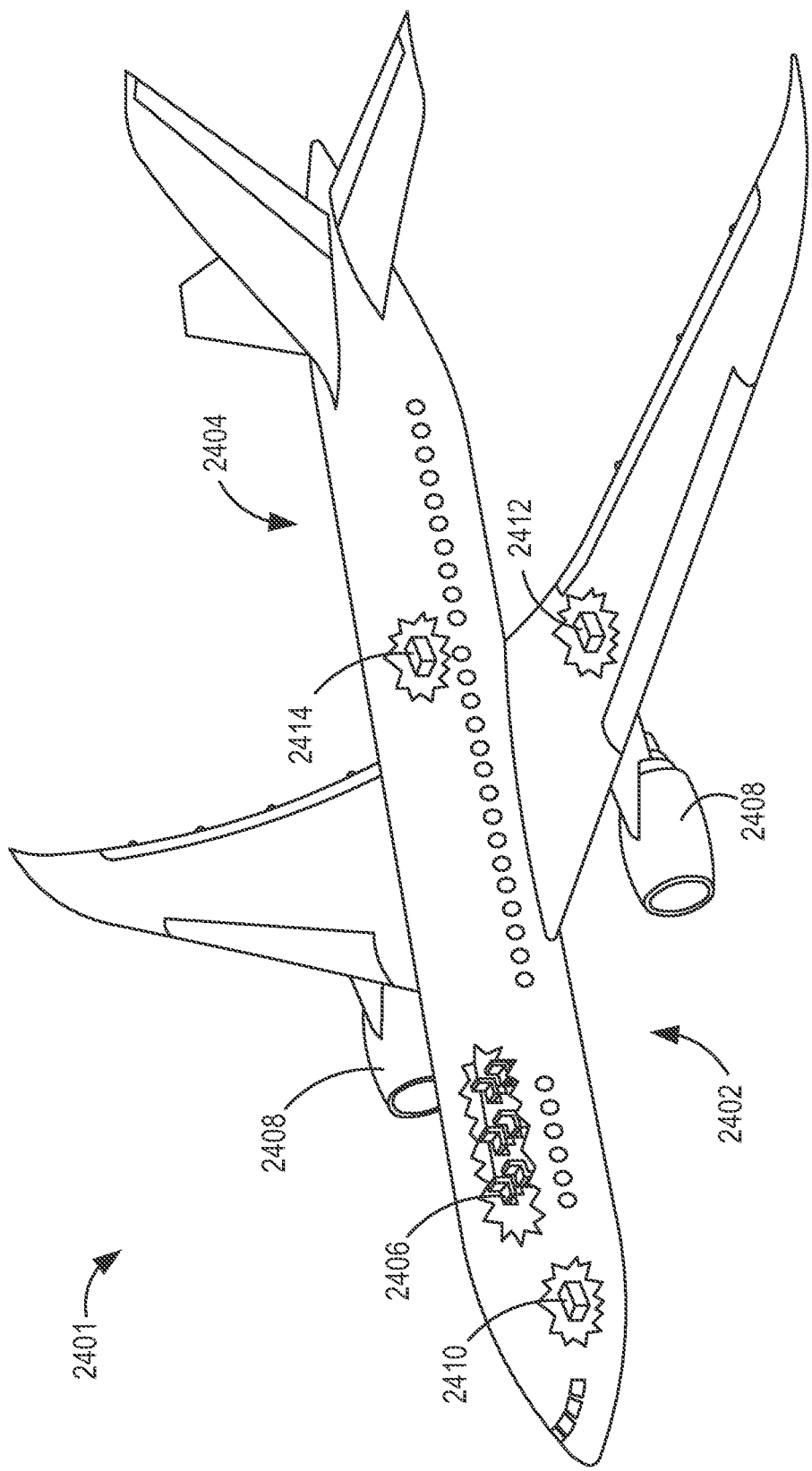
FIG. 24 is a schematic perspective view of a particular flying module.

With reference now to FIG. 24, a more specific diagram of the flying apparatus 2401 is depicted in which an implementation of the disclosure is advantageously employed. In this example, the flying apparatus 2401 includes an airframe 2403 with a plurality of systems 2404 and an interior 2406. Implementations of the plurality of systems 1804 include one or more of a propulsion system 2408, an electrical system 2410, a hydraulic system 2412, and an environmental system 2414. The system may be implemented in the aircraft navigation system or on a portable computing device utilized by a pilot within the aircraft. Other systems, not shown, are also candidates for inclusion. Although an aerospace example is shown, different advantageous implementations are applied to other industries, such as the automotive industry, etc.

Although described in connection with the computing device 108 depicted in FIG. 1, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

The following paragraphs describe further aspects of the disclosure. In some implementations, the paragraphs described below can be further combined in any sub-combination without departing from the scope of the present disclosure.

1A. A system for provision of dynamic integrated terminal approach procedure interfaces, the system comprising:
  a set of data sources providing aircraft data associated with a selected aircraft, airport data associated with at least one airport and real-time weather data associated with a set of possible routes between a selected departure airport and at least one destination airport;
  a computing device comprising a computer-readable medium storing instructions that are operative upon execution by a processor to:
  provide, via user interface device, an integrated approach interface comprising a map interface and a procedure side bar providing integrated terminal approach data associated with the set of possible routes based on the aircraft data, and the airport data, wherein data displayed within the integrated approach interface is customized for the selected aircraft, the at least one destination airport and the real-time weather data associated with the at least one destination airport;
  generate a set of recommendations based on an evaluation of the integrated terminal approach data and real-time weather data updates, the set of recommendations comprising a set of recommended routes selected from the set of possible routes; and
  update the integrated approach interface in response to generating the set of recommendations, wherein the update comprises displaying data associated with the set of recommended routes and remove data associated with routes excluded from the set of recommended routes from the map interface and the procedure side bar.

2A. The system of claim 1, wherein the instructions are further operative to:
  update the integrated terminal approach data displayed within the integrated approach interface to remove data associated with unselected routes in the set of recommended routes responsive to receiving a user-selection of a route from the set of recommended routes.

3A. The system of claim 1, wherein the instructions are further operative to:
  highlight a selected route in the map interface responsive to receiving a user-selection of a route from the set of possible routes associated with the destination airport.

4A. The system of claim 1, wherein the instructions are further operative to:
  provide terminal approach procedures data associated with a user-selected approach within the procedures side bar in a linear table view, wherein the data is curated to remove non-essential terminal procedures data which is unrelated to the user-selected approach from view.

5A. The system of claim 1, wherein the instructions are further operative to:
  present terminal approach procedures data associated with a user-selected approach within the procedures side bar in a hierarchical top-down format, wherein the terminal approach procedures data comprises briefing information, customized notes, route data and missed approach data.

6A. The system of claim 1, wherein the instructions are further operative to:
  display terminal procedure information supporting evaluation and selection of terminal procedures by a pilot dynamically during pre-flight planning and in-flight procedures.

7A. The system of claim 1, wherein the instructions are further operative to:
  overlay a set of markers on a map within the map interface, the set of markers comprising at least one of an initial approach fix, a final approach fix, a minimum altitude, a maximum altitude, and speed restrictions.

8A. A method for dynamic integrated terminal approach procedure interfaces, the method comprising:

obtaining, from a plurality of data sources, aircraft data associated with a selected aircraft, airport data associated with at least one airport and real-time weather data associated with a set of possible routes between a selected departure airport and at least one destination airport;

providing, via user interface device, an integrated approach interface comprising a map interface and a procedure side bar providing integrated terminal approach data associated with the set of possible routes based on the aircraft data, and the airport data, wherein data displayed within the integrated approach interface is customized for the selected aircraft, the at least one destination airport and the real-time weather data associated with the at least one destination airport;

generating a set of recommendations based on an evaluation of the integrated terminal approach data and real-time weather data updates, the set of recommendations comprising a set of recommended routes selected from the set of possible routes; and updating the integrated approach interface in response to generating the set of recommendations, wherein the update comprises displaying data associated with the set of recommended routes and remove data associated with routes excluded from the set of recommended routes from the map interface and the procedure side bar.

9A. The method of claim 8, further comprising:

updating the integrated terminal approach data displayed within the integrated approach interface to remove data associated with unselected routes in the set of recommended routes responsive to receiving a user-selection of a route from the set of recommended routes.

10A. The method of claim 9, further comprising:

highlighting a selected route in the map interface responsive to receiving a user-selection of a route from the set of possible routes associated with the destination airport.

11A. The method of claim 8, further comprising:

providing terminal approach procedures data associated with a user-selected approach within the procedures side bar in a linear table view, wherein the data is curated to remove non-essential terminal procedures data which is unrelated to the user-selected approach from view.

12A. The method of claim 8, further comprising:

presenting terminal approach procedures data associated with a user-selected approach within the procedures side bar in a hierarchical top-down format, wherein the terminal approach procedures data comprises briefing information, customized notes, route data and missed approach data.

13A. The method of claim 8, further comprising:

displaying terminal procedure information supporting evaluation and selection of terminal procedures by a pilot dynamically during pre-flight planning and in-flight procedures.

14A. The method of claim 8, further comprising:

overlaying a set of markers on a map within the map interface, the set of markers comprising at least one of an initial approach fix, a final approach fix, a minimum altitude, a maximum altitude, and speed restrictions.

15A. A computer program product, comprising a computer usable medium having a computer readable program code embodied therein, the computer readable program code adapted to be executed to implement a method for providing dynamic integrated terminal approach procedure interfaces, the method comprising:

obtaining, from a plurality of data sources, aircraft data associated with a selected aircraft, airport data associated with at least one airport and real-time weather data associated with a set of possible routes between a selected departure airport and at least one destination airport;

providing, via user interface device, an integrated approach interface comprising a map interface and a procedure side bar providing integrated terminal approach data associated with the set of possible routes based on the aircraft data, and the airport data, wherein data displayed within the integrated approach interface is customized for the selected aircraft, the at least one destination airport and the real-time weather data associated with the at least one destination airport;

generating a set of recommendations based on an evaluation of the integrated terminal approach data and real-time weather data updates, the set of recommendations comprising a set of recommended routes selected from the set of possible routes; and updating the integrated approach interface in response to generating the set of recommendations, wherein the update comprises displaying data associated with the set of recommended routes and remove data associated with routes excluded from the set of recommended routes from the map interface and the procedure side bar.

16A. The method of claim 15, further comprising:

updating the integrated terminal approach data displayed within the integrated approach interface to remove data associated with unselected routes in the set of recommended routes responsive to receiving a user-selection of a route from the set of recommended routes.

17A. The method of claim 16, further comprising:

highlighting a selected route in the map interface responsive to receiving a user-selection of a route from the set of possible routes associated with the destination airport.

18A. The method of claim 15, further comprising:

providing terminal approach procedures data associated with a user-selected approach within the procedures side bar in a linear table view, wherein the data is curated to remove non-essential terminal procedures data which is unrelated to the user-selected approach from view.

19A. The method of claim 18, further comprising:

presenting terminal approach procedures data associated with a user-selected approach within the procedures side bar in a hierarchical top-down format, wherein the terminal approach procedures data comprises briefing information, customized notes, route data and missed approach data.

20A. The method of claim 15, further comprising:
  displaying terminal procedure information supporting evaluation and selection of terminal procedures by a pilot dynamically during pre-flight planning and in-flight procedures.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A system for generating a terminal procedure interface, the system comprising:
  a plurality of data sources providing aircraft data associated with a selected aircraft, airport data associated with at least one airport, approach plate data associated with the at least one airport, and real-time weather data associated with a set of possible routes between a selected departure airport of the at least one airport and a selected destination airport of the at least one airport;
  a computing device comprising a processor and a computer-readable medium storing instructions that are operative upon execution by the processor to cause the processor to:
    provide, via a user interface device, terminal procedures data associated with a selected route to the destination airport within a terminal procedure bar, wherein the terminal procedures data comprises approach plate data associated with the selected destination airport that comprises landing procedures for the selected destination airport and is customized for the selected aircraft, the selected destination airport, and the real-time weather data associated with the selected destination airport;

access weather thresholds for a pilot associated with the selected aircraft;

based on a real-time evaluation, while the selected aircraft is in route along the selected route to the destination airport, of the approach plate data associated with the selected destination airport, the aircraft data, the real-time weather data, the airport data associated with the selected destination airport, and the weather thresholds for the pilot, automatically adjust one or more parameters of the landing procedures for the selected destination airport within the terminal procedures data; and automatically present the adjusted landing procedures within the terminal procedure bar.

2. The system of claim 1, wherein the weather thresholds for the pilot comprise a wind direction threshold and a wind intensity threshold.

3. The system of claim 1, wherein the terminal procedures data is assimilated to remove non-essential terminal procedures data unrelated to the selected route from view.

4. A system for generating a terminal procedure interface, the system comprising:

a computing device comprising a processor and a computer-readable medium storing instructions that are operative upon execution by the processor to cause the processor to:

provide, via a user interface device, a map interface displaying a map associated with a destination airport into which an aircraft is on an approach for landing;

receive approach plate data associated with the destination airport;

customize the approach plate data associated with the destination airport based on aircraft data associated with the aircraft, airport data associated with the destination airport, and real-time weather data associated with the approach for landing;

provide, via the user interface device, a terminal procedure bar displaying integrated terminal procedures data associated with the approach for landing at the destination airport, wherein the integrated terminal procedures data comprises the customized approach plate data;

automatically adjust the integrated terminal procedures data based on a real-time evaluation of the approach plate data associated with the destination airport, the aircraft data, the airport data, and the real-time weather data; and automatically present the adjusted integrated terminal procedures data within the terminal procedure bar.

5. The system of claim 4, wherein the approach plate data associated with the destination airport comprises a landing procedure for the aircraft to perform the approach for landing; and the instructions are operative upon execution by the processor to cause the processor to:

automatically adjust one or more parameters of the landing procedure based on the real-time evaluation of the approach plate data associated with the destination airport, the aircraft data, the airport data, and the real-time weather data; and automatically present the adjusted one or more parameters of the landing procedure within the terminal procedure bar.

6. The system of claim 5, wherein the landing procedure comprises a step-by-step procedure for a pilot of the aircraft to perform the approach for landing; and the instructions are operative upon execution by the processor to cause the processor to:

automatically adjust one or more steps of the step-by-step procedure for the pilot of the aircraft to perform the approach for landing; and automatically present the adjusted one or more steps within the terminal procedure bar.

7. The system of claim 6, wherein the steps of the step-by-stop procedure are arranged in a linear, hierarchical format.

8. The system of claim 5, wherein the instructions are operative upon execution by the processor to cause the processor to automatically adjust one or more of a minimum altitude, a maximum altitude, and an approach speed for the landing procedure.

9. The system of claim 5, wherein the instructions are operative upon execution by the processor to cause the processor to automatically adjust one or more of an initial approach fix, a final approach fix, altitude restrictions at initial approach fixes, and/or altitude restrictions at final approach fixes.

10. The system of claim 5, wherein the instructions are operative upon execution by the processor to cause the processor to automatically displaying a missed approach procedure based on the real-time evaluation of the approach plate data associated with the destination airport, the aircraft data, the airport data, and the real-time weather data.

11. The system of claim 10, wherein the instructions are operative upon execution by the processor to cause the processor to automatically remove data associated with the landing procedure when the missed approach procedure is displayed.

12. The system of claim 4, wherein the instructions are operative upon execution by the processor to cause the processor to perform the real-time evaluation of the approach plate data associated with the destination airport, the aircraft data, the airport data, and the real-time weather data.

13. The system of claim 4, wherein the real-time evaluation includes one or more of a real-time evaluation of personal parameters associated with a pilot of the aircraft and a real-time evaluation of company parameters associated with a company that owns the aircraft.

14. The system of claim 4, wherein:

the approach plate data associated with the destination airport comprises a plurality of available approach procedures for landing at the destination airport;

the instructions are operative upon execution by the processor to cause the processor to:

determine a plurality of selectable approach procedures by removing one or more approach procedures from the plurality of available approach procedures based on the aircraft data associated with the aircraft, the airport data associated with the destination airport, and real-time weather data associated with the destination airport; and present, within the terminal procedure bar, selected approach data that indicates the plurality of selectable approach procedures.

15. The system of claim 13, wherein the instructions are operative upon execution by the processor to cause the processor to:
receive a selection of one of the plurality of selectable approach procedures via the user interface device; and
remove data associated with unselected approach procedures of the plurality of selectable approach procedures when presenting the adjusted integrated terminal procedures data.

16. The system of claim 4, wherein the instructions are operative upon execution by the processor to cause the processor to:
provide the map interface with an overlay based on the integrated terminal procedures data; and
automatically update the overlay based on the adjusted integrated terminal procedures data.

17. The system of claim 16, wherein the overlay comprises one or more of approach speed markers, speed restriction markers, minimum altitude markers, maximum altitude markers, an initial approach fix, a final approach fix, altitude restrictions, and missed approach markers.

18. A system for generating a terminal procedure interface, the system comprising:
a computing device comprising a processor and a computer-readable medium storing instructions that are operative upon execution by the processor to cause the processor to:
retrieve, from a plurality of data sources, aircraft data associated with a selected aircraft, airport data associated with a destination airport at which the selected aircraft will land, approach plate data comprising a set of possible approaches to the destination airport, and real-time weather data associated with the set of possible approaches to the destination airport;
provide, via a user interface device, a map interface displaying a map associated with the destination airport;
generate a set of recommendations based on a real-time evaluation of the aircraft data associated with the selected aircraft, the airport data associated with the destination airport, the approach plate data, and the real-time weather data associated with the set of possible approaches to the destination airport, the set of recommendations comprising a set of recommended approaches selected from the set of possible approaches;
provide, via the user interface device, a terminal procedure bar including the set of recommended approaches; and
automatically update the terminal procedure bar in response to a user input associated with a selected approach from the set of recommended approaches, the update including removing data associated with other approaches from the set of recommended approaches and displaying a selected approach procedure for the selected approach.

19. The system of claim 18, wherein:
the selected aircraft is on the selected approach for landing at the destination airport; and
the instructions are operative upon execution by the processor to cause the processor to:
provide, via the terminal procedure bar, integrated terminal procedures data comprising the selected approach procedure for landing at the destination airport, wherein the integrated terminal procedures data is customized based on the aircraft data associated with the aircraft, the airport data associated with the destination airport, and the real-time weather data associated with the selected approach for landing.

20. The system of claim 19, wherein:
the selected approach procedure comprises a landing procedure for the aircraft to perform the selected approach for landing at the destination airport; and
the instructions are operative upon execution by the processor to cause the processor to:
automatically adjust one or more parameters of the landing procedure based on a real-time evaluation of the integrated terminal procedures data, the aircraft data, the airport data, and the real-time weather data; and
automatically present the one or more adjusted parameters within the terminal procedure bar.

* * * * *